US011917472B2

(12) United States Patent
Liu et al.

(10) Patent No.: US 11,917,472 B2
(45) Date of Patent: Feb. 27, 2024

(54) FACILITATING QUALITY OF SERVICE FLOW REMAPPING UTILIZING A SERVICE DATA ADAPTATION PROTOCOL LAYER

(71) Applicant: QUALCOMM Incorporated, San Diego, CA (US)

(72) Inventors: Feilu Liu, San Diego, CA (US); Yu-Ting Yu, San Francisco, CA (US); Srinivas Reddy Mudireddy, San Diego, CA (US); Tom Chin, San Diego, CA (US); Suli Zhao, San Diego, CA (US); Aziz Gholmieh, Del Mar, CA (US); Xing Chen, San Diego, CA (US); Ozcan Ozturk, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/585,383

(22) Filed: Jan. 26, 2022

(65) Prior Publication Data
US 2022/0150782 A1 May 12, 2022

Related U.S. Application Data

(62) Division of application No. 16/380,924, filed on Apr. 10, 2019, now Pat. No. 11,310,707.
(Continued)

(51) Int. Cl.
H04W 36/06 (2009.01)
H04W 28/02 (2009.01)
H04W 28/16 (2009.01)

(52) U.S. Cl.
CPC ....... H04W 36/06 (2013.01); H04W 28/0263 (2013.01); H04W 28/0268 (2013.01); H04W 28/16 (2013.01)

(58) Field of Classification Search
CPC ............ H04W 36/06; H04W 28/0263; H04W 28/0268; H04W 28/16
See application file for complete search history.

(56) References Cited

U.S. PATENT DOCUMENTS 11,102,670 B2    8/2021  Jo et al.
11,553,369 B2 *  1/2023  Maeder ................... H04L 69/14
(Continued)

FOREIGN PATENT DOCUMENTS

CN    1429459 A    7/2003

OTHER PUBLICATIONS

V. Kopparty, V. Manjunath, K. Subramaniam, P. Jain and V. M. Gadag, "Efficient methods for bearer traffic flow migration in NG-RAN," 2018 IEEE Wireless Communications and Networking Conference (WCNC), Barcelona, Spain, 2018, pp. 1-6, doi: 10.1109/WCNC.2018.8377065. (Year: 2018).*
(Continued)

Primary Examiner — Redentor Pasia
(74) Attorney, Agent, or Firm — Loza & Loza LLP

(57) ABSTRACT

Aspects directed towards Quality of Service (QoS) flow remapping are disclosed. In an example, upon detecting a mapping reconfiguration of a first QoS flow from a first data radio bearer (DRB) to another DRB, a Service Data Adaptation Protocol (SDAP) control protocol data unit (PDU) is generated indicating that a final SDAP data PDU associated with the first QoS flow has been transmitted on the first DRB. The SDAP control PDU is then transmitted via the first DRB. In another example, upon detecting a mapping reconfiguration of a first QoS flow from a first DRB to another DRB, an end marker parameter is set in an SDAP header of a first SDAP data PDU received from an upper layer after the mapping reconfiguration indicating that the
(Continued)

first SDAP data PDU is a final SDAP data PDU associated with the first QoS flow transmitted on the first DRB.

14 Claims, 13 Drawing Sheets

Related U.S. Application Data

(60) Provisional application No. 62/657,664, filed on Apr. 13, 2018.

(56) References Cited

U.S. PATENT DOCUMENTS

| | | | |
|---|---|---|---|
| 2018/0234839 A1* | 8/2018 | Tenny | H04W 12/10 |
| 2018/0317120 A1 | 11/2018 | Wang et al. | |
| 2018/0324631 A1* | 11/2018 | Jheng | H04W 28/0268 |
| 2019/0028920 A1 | 1/2019 | Pan | |
| 2019/0029057 A1 | 1/2019 | Pan et al. | |
| 2019/0150023 A1 | 5/2019 | Cho et al. | |
| 2019/0268818 A1* | 8/2019 | Yi | H04W 36/0033 |
| 2019/0313262 A1 | 10/2019 | Huang-Fu et al. | |
| 2019/0320362 A1* | 10/2019 | Liu | H04W 28/0268 |
| 2019/0349803 A1 | 11/2019 | Byun et al. | |
| 2019/0349810 A1 | 11/2019 | Cho et al. | |
| 2019/0394669 A1* | 12/2019 | Han | H04W 36/0069 |
| 2020/0022213 A1* | 1/2020 | Han | H04W 76/12 |
| 2020/0037197 A1 | 1/2020 | Cho et al. | |
| 2020/0059817 A1* | 2/2020 | Baek | H04W 28/0273 |
| 2020/0068427 A1* | 2/2020 | Turtinen | H04W 28/24 |
| 2020/0128430 A1 | 4/2020 | Yi et al. | |
| 2020/0154304 A1 | 5/2020 | Cho et al. | |
| 2020/0187044 A1* | 6/2020 | Jiang | H04W 76/20 |
| 2020/0314695 A1* | 10/2020 | You | H04W 28/0263 |
| 2021/0144588 A1* | 5/2021 | Tang | H04W 76/27 |

OTHER PUBLICATIONS

Oppo, "In-Order Delivery for QoS Flow Remapping", R2-1801970, 3GPP TSG-RAN2 Meeting 101, Athens, Greece, Feb. 26-Mar. 2, 2018, pp. 1-2.
Sharp: "SDAP Header Configuration", R2-1708290, 3GPP TSG-RAN WG2 Meeting 99, Berlin, Germany, Aug. 21-25, 2017, pp. 1-2.
Taiwan Search Report—TW108112654—TIPO—dated Apr. 27, 2022.
Catt: "QoS Re-Mapping of QoS Flow and DRB", 3GPP Draft; R2-1710312, 3rd Generation Partnership Project (3GPP), Mobile Competence Centre ; 650, Route Des Lucioles ; F-06921 Sophia-Antipolis Cedex ; France, vol. RAN WG2, No. Prague, Czech Republic; Oct. 9, 2017-Oct. 13, 2017, Oct. 8, 2017 (Oct. 8, 2017), XP051342360, 3 Pages, Retrieved from the Internet: URL:http://www.3gpp.org/ftp/Meetings_3GPP_SYNC/RAN2/Docs/ [retrieved on Oct. 8, 2017], Paragraph [0002] ; Figure 1 p. 2, line 17-line 19, Paragraph [02.1], Paragraph [0001].
Ericsson: "QoS Flow Remapping and End Marker", 3GPP Draft; R2-1805507—QoS Flow Remapping And End Marker, 3rd Generation Partnership Project (3GPP), Mobile Competence Centre ; 650, Route Des Lucioles ; F-06921 Sophia-Antipolis Cedex ; France, vol. RAN WG2, No. Sanya, P. R China; Apr. 16, 2018-Apr. 20, 2018, Apr. 5, 2018 (Apr. 5, 2018), XP051415101, 5 Pages, Retrieved from the Internet: URL:http://www.3gpp.org/ftp/tsg%5Fran/WG2%5FRL2/TSGR2%5F101bis/Docs/ [retrieved on Apr. 5, 2018], paragraph [8002]; figure 1, p. 3, line 3-line 5, p. 2, line 1-line 2, section 3.1; pp. 1-2 p. 5, lines 21-24.
Huawei et al., "QoS Flow to DRB Re-Mapping for Uplink", 3GPP Draft; R2-1804620 QoS Flow To DRB Re-Mapping For Uplink, 3rd Generation Partnership Project (3GPP), Mobile Competence Centre ; 650, Route Des Lucioles ; F-06921 Sophia-Antipolis Cedex ; France, vol. RAN WG2, No. Sanya, China; Apr. 16, 2018-Apr. 20, 2018, Apr. 6, 2018 (Apr. 6, 2018), XP051415607, 4 Pages, Retrieved from the Internet: URL:http://www.3gpp.org/ftp/tsg%5Fran/WG2%5FRL2/TSGR2%5F101bis/Docs/ [retrieved on Apr. 6, 2018-04-06), paragraph [02 .2], figures 6.2.2.3-1.
International Preliminary Report on Patentability—PCT/US2019/026925 The International Bureau of WIPO—Geneva, Switzerland, dated Oct. 22, 2020.
International Search Report and Written Opinion—PCT/US2019/026925—ISA/EPO—dated Jun. 12, 2019).
Mediatek Inc: "SDAP Header Design for Reflective QoS Indication and QoS Flow Remapping", 3GPP Draft; R2-1708260 Sdap Header Design For Reflective QoS Indication And QoS Flow Remapping, 3rd Generation Partnership Project (3GPP), Mobile Competence Centre ; 650, Route Des Lucioles ; F-06921 , vol. RAN WG2, No. Berlin, Germany; Aug. 21, 2017-Aug. 25, 2017, Aug. 20, 2017 (Aug. 20, 2017), XP051318160, 7 Pages. Retrieved from the Internet: URL:http://www.3gpp.org/ftp/Meetings_3GPP_SYNC/RAN2/Docs/ [retrieved on Aug. 20, 2017], paragraph [02.2], p. 3, line 3-line 10, figure 1, paragraph [0005], paragraph [5.3.1], paragraph [5.3.2], sections 1, 2.1, 2.2; pp. 1-3.
Vivo: "Discussion on the QoS Flow Remapping", 3GPP Draft; R2-1804695_Discussion on the QoS Flow Remapping, 3rd Generation Partnership Project (3GPP), Mobile Competence Centre ; 650, Route Des Lucioles ; F-06921 Sophia-Antipolis Cedex ; France, vol. RAN WG2, No. Sanya, China; Apr. 16, 2018-Apr. 20, 2018, Apr. 5, 2018 (Apr. 5, 2018), XP051414848, 6 Pages, Retrieved from the Internet: URL:http://www.3gpp.org/ftp/tsg%5Fran/WG2%5FRL2/TSGR2%5F101bis/Docs/ [retrieved on Apr. 5, 2018], paragraph [02 .2], p. 3, line 1-line 5 figures 6.2.2 .x-1, figures 6.2. 2.x-2.
ITRI: "Discussion on Sdap Header Format ", 3GPP TSG-RAN WG2 Meeting #99, R2-1709084, Berlin, Germany, Aug. 21-25, 2017, pp. 1-3.

* cited by examiner

FACILITATING QUALITY OF SERVICE FLOW REMAPPING UTILIZING A SERVICE DATA ADAPTATION PROTOCOL LAYER

PRIORITY CLAIM

The present application for patent is a Divisional application of U.S. Non-Provisional application Ser. No. 16/380,924, filed in the U.S. Patent and Trademark Office on Apr. 10, 2019, the entire contents of which are incorporated herein by reference as if fully set forth below in their entirety and for all applicable purposes. application Ser. No. 16/380,924 claims priority to and the benefit of Provisional Patent Application No. 62/657,664, filed in the U.S. Patent and Trademark Office on Apr. 13, 2018, the entire contents of which are incorporated herein by reference as if fully set forth below in their entirety and for all applicable purposes.

TECHNICAL FIELD

The technology discussed below relates generally to wireless communication systems, and more particularly, to utilizing a Service Data Adaptation Protocol (SDAP) layer to facilitate Quality of Service (QoS) flow remapping.

INTRODUCTION

Within a wireless communication network, Quality of Service (QoS) refers to a set of technologies that enable the network to meet specific performance parameters (e.g., reliability and/or target delay). Such QoS technologies achieve these performance parameters by applying different handling to different traffic flows in the network. For example, each flow may be assigned a particular QoS, which assists the network in determining, among other things, the order in which packets from each of the flows are handled and the amount of bandwidth allocated to each flow. Each QoS flow may further be mapped to a data radio bearer (DRB) established between a user equipment (UE) and a base station.

Mapping and remapping particular QoS flows to corresponding data radio bearers, however, is becoming more challenging with the introduction of Fifth Generation (5G), e.g., New Radio (NR), networks. As the demand for mobile broadband access continues to increase, research and development continue to advance communication technologies, including technologies for enhancing QoS flow mapping in particular, not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to mechanisms for utilizing a Service Data Adaptation Protocol (SDAP) layer to facilitate Quality of Service (QoS) flow remapping. In an example, upon detecting a mapping reconfiguration of a first QoS flow from a first data radio bearer (DRB) to another DRB, a Service Data Adaptation Protocol (SDAP) control protocol data unit (PDU) is generated indicating that a final SDAP data PDU associated with the first QoS flow has been transmitted on the first DRB. The SDAP control PDU is then transmitted to a receiver via the first DRB. In another example, upon detecting a mapping reconfiguration of a first QoS flow from a first DRB to another DRB, an end marker parameter is set in an SDAP header of a first SDAP data PDU received from an upper layer after the mapping reconfiguration indicating that the first SDAP data PDU is a final SDAP data PDU associated with the first QoS flow transmitted on the first DRB. The first SDAP data PDU and at least one subsequent SDAP data PDU associated with the first QoS flow may then be transmitted to a receiver such that the first SDAP data PDU is transmitted via the first DRB and the at least one subsequent SDAP data PDU is transmitted via the second DRB.

In one example, a method of wireless communication is disclosed. The method includes detecting a mapping reconfiguration of a first Quality of Service (QoS) flow from a first data radio bearer (DRB) to a second DRB, and generating a Service Data Adaptation Protocol (SDAP) control protocol data unit (PDU) in response to the mapping reconfiguration, in which the SDAP control PDU provides an indication that a final SDAP data PDU associated with the first QoS flow has been transmitted on the first DRB. The method further includes transmitting the SDAP control PDU via the first DRB to a receiver.

Another example provides a scheduled entity within a wireless communication network. The scheduled entity includes a processor, a transceiver communicatively coupled to the processor, and a memory communicatively coupled to the processor. The processor is configured to detect a mapping reconfiguration of a first Quality of Service (QoS) flow from a first data radio bearer (DRB) to a second DRB, and generate a Service Data Adaptation Protocol (SDAP) control protocol data unit (PDU) in response to the mapping reconfiguration, in which the SDAP control PDU provides an indication that a final SDAP data PDU associated with the first QoS flow has been transmitted on the first DRB. The processor is further configured to transmit the SDAP control PDU via the first DRB to a scheduling entity via the transceiver.

Another example provides a method of wireless communication. The method includes receiving a plurality of Service Data Adaptation Protocol (SDAP) data protocol data units (PDUs) associated with a first QoS flow via both a first data radio bearer (DRB) and a second DRB, receiving an SDAP control PDU applicable to the first QoS flow via the first DRB, and forwarding the plurality of SDAP data PDUs received via the second DRB to an upper layer in response to receiving the SDAP control PDU applicable to the first QoS flow via the first DRB, where the SDAP control PDU provides an indication that a final SDAP data PDU associated with the first QoS flow has been transmitted on the first DRB.

Another example provides a scheduling entity within a wireless communication network. The scheduling entity includes a processor, a transceiver communicatively coupled to the processor, and a memory communicatively coupled to the processor. The processor is configured to receive a plurality of Service Data Adaptation Protocol (SDAP) data protocol data units (PDUs) associated with a first QoS flow via both a first data radio bearer (DRB) and a second DRB from a scheduled entity via the transceiver, receive an SDAP control PDU applicable to the first QoS flow via the first DRB from the scheduled entity via the transceiver, and forward the plurality of SDAP data PDUs received via the second DRB to an upper layer in response to receiving the SDAP control PDU applicable to the first QoS flow via the first DRB, where the SDAP control PDU provides an indication that a final SDAP data PDU associated with the first QoS flow has been transmitted on the first DRB.

Another example provides a method of wireless communication. The method includes detecting a mapping reconfiguration of a first Quality of Service (QoS) flow from a first data radio bearer (DRB) to a second DRB, and setting an end marker parameter in a Service Data Adaptation Protocol (SDAP) header of a first SDAP data protocol data unit (PDU) received from an upper layer after the mapping reconfiguration, where the end marker parameter provides an indication that the first SDAP data PDU is a final SDAP data PDU associated with the first QoS flow on the first DRB. The method further includes transmitting the first SDAP data PDU and at least one subsequent SDAP data PDU associated with the first QoS flow to a receiver, where the first SDAP data PDU is transmitted via the first DRB and the at least one subsequent SDAP data PDU is transmitted via the second DRB.

Another example provides a scheduled entity in a wireless communication network. The scheduled entity includes a processor, a transceiver communicatively coupled to the processor, and a memory communicatively coupled to the processor. The processor is configured to detect a mapping reconfiguration of a first Quality of Service (QoS) flow from a first data radio bearer (DRB) to a second DRB, and set an end marker parameter in a Service Data Adaptation Protocol (SDAP) header of a first SDAP data protocol data unit (PDU) received from an upper layer after the mapping reconfiguration, where the end marker parameter provides an indication that the first SDAP data PDU is a final SDAP data PDU associated with the first QoS flow on the first DRB. The processor is further configured to transmit the first SDAP data PDU and at least one subsequent SDAP data PDU associated with the first QoS flow to a scheduling entity via the transceiver, where the first SDAP data PDU is transmitted via the first DRB and the at least one subsequent SDAP data PDU is transmitted via the second DRB.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
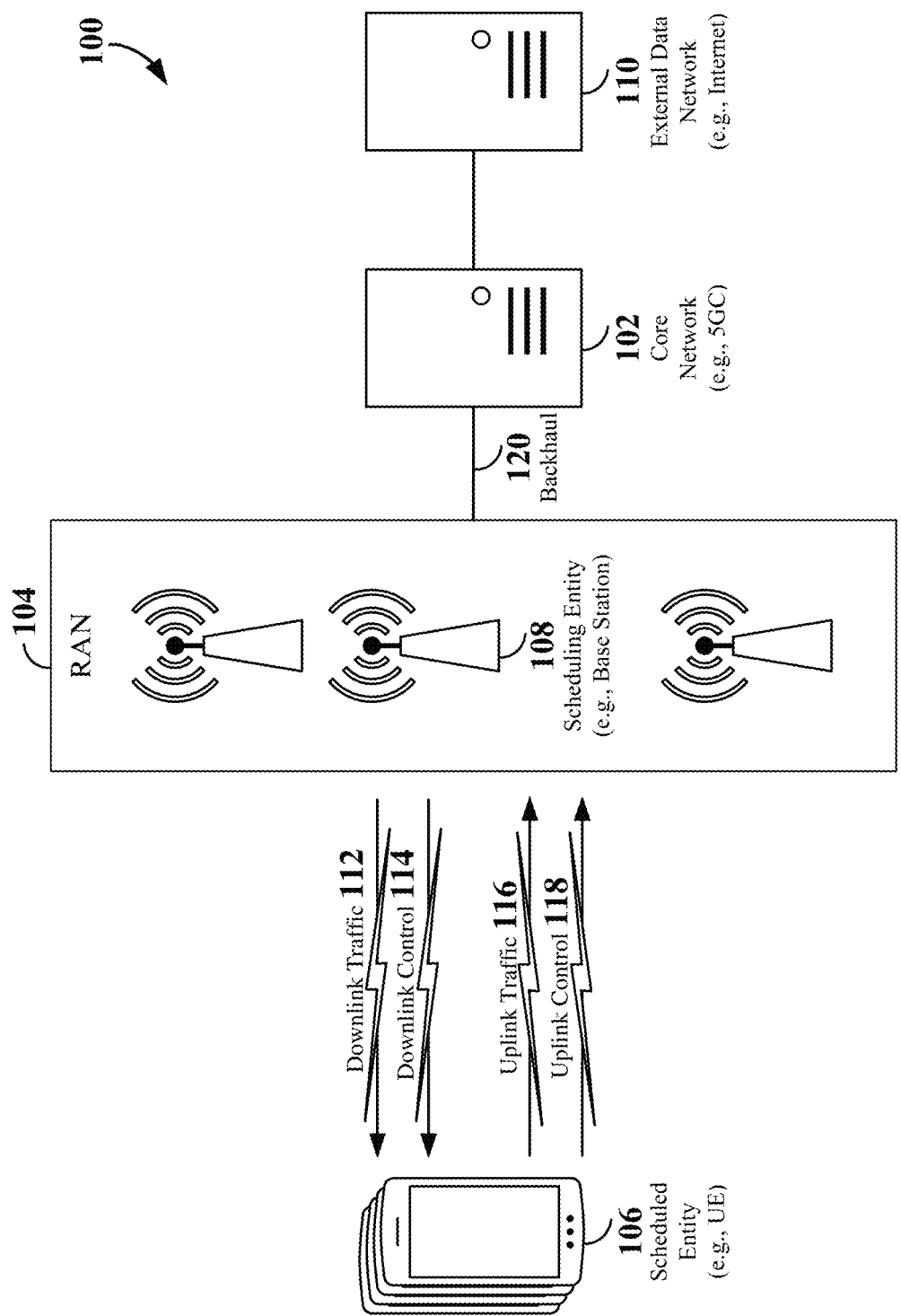
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
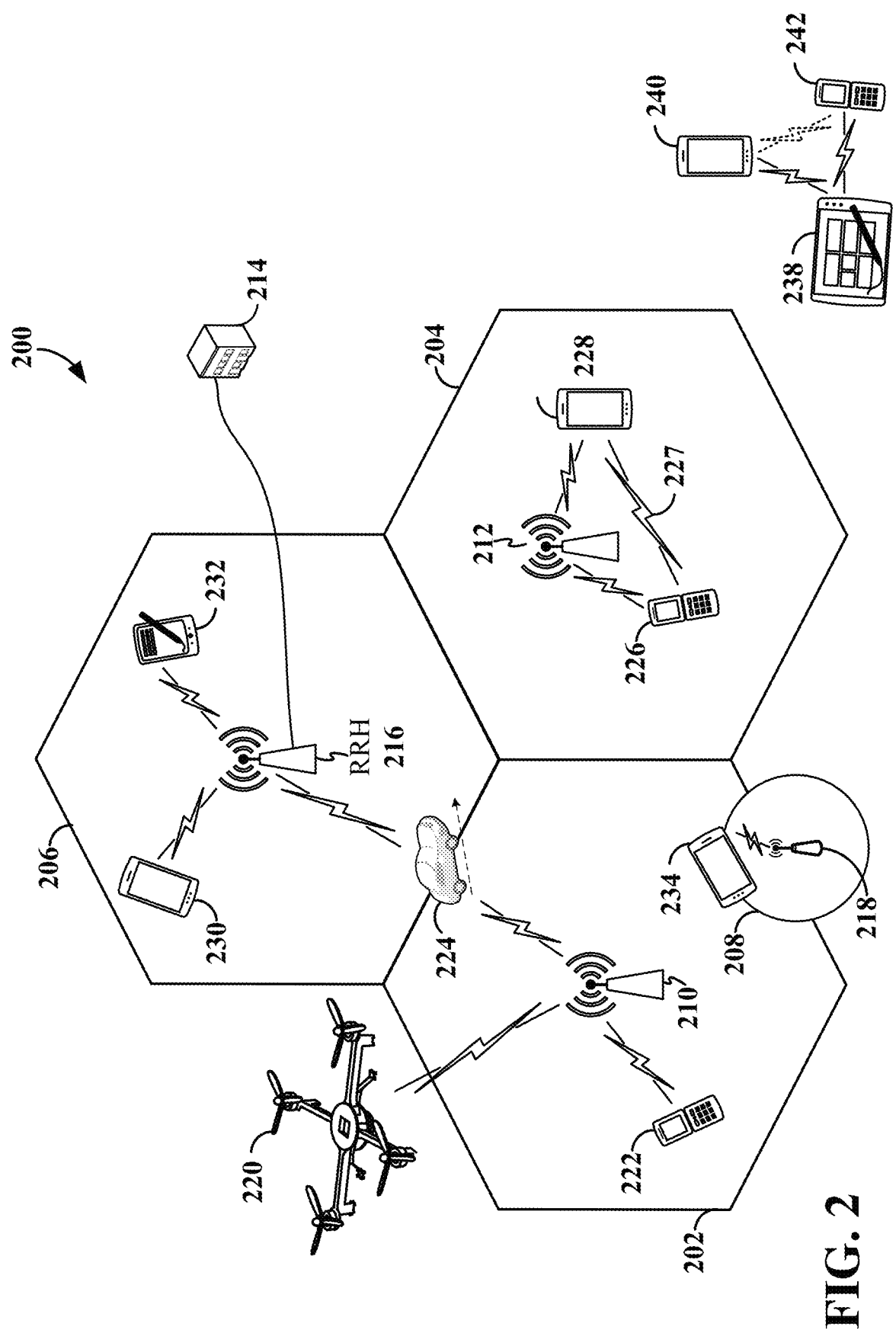
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The radio protocol architecture for a RAN, such as the RAN 200 shown in FIG. 2, may take on various forms depending on the particular application. An example of a radio protocol architecture for the user and control planes is illustrated FIG. 3.

Figure 3:
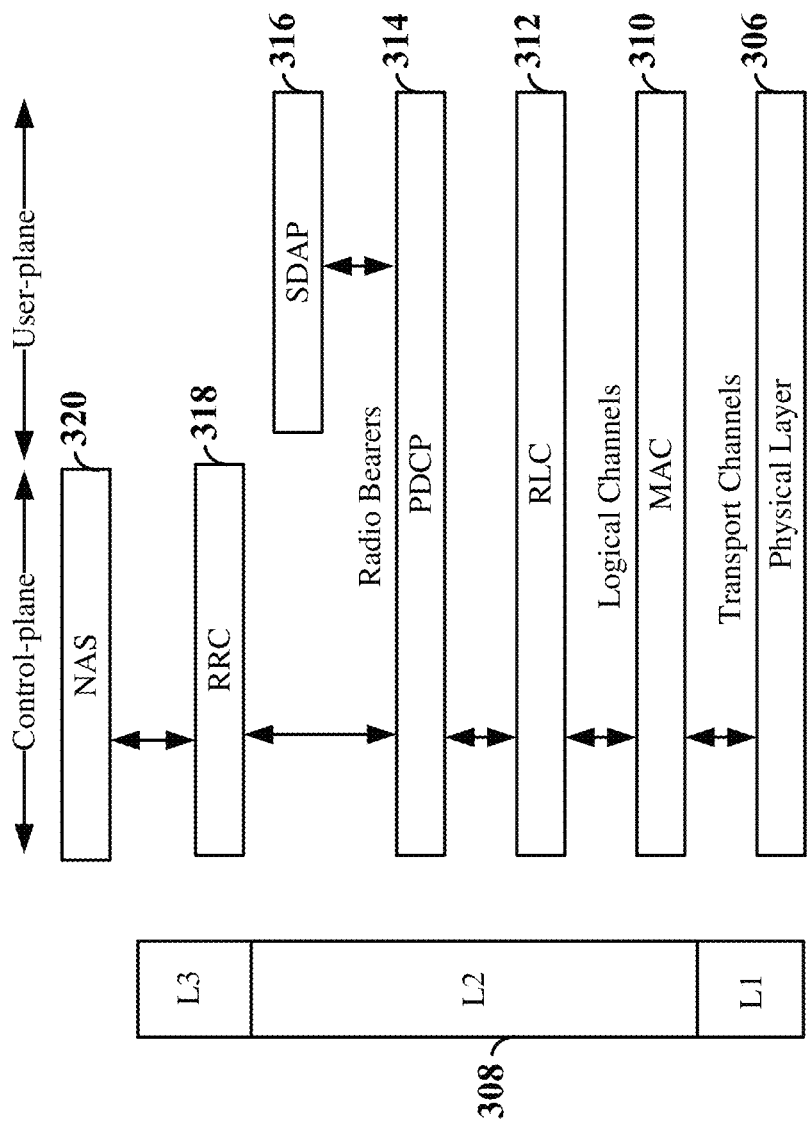
FIG. 3 is a diagram illustrating an example of a radio protocol architecture for the user and control plane.

As illustrated in FIG. 3, the radio protocol architecture for the UE and the base station includes three layers: layer 1 (L1), layer 2 (L2), and layer 3 (L3). L1 is the lowest layer and implements various physical layer signal processing functions. L1 will be referred to herein as the physical layer 306. L2 308 is above the physical layer 306 and is responsible for the link between the UE and base station over the physical layer 306.

In the user plane, the L2 layer 308 includes a media access control (MAC) layer 310, a radio link control (RLC) layer 312, a packet data convergence protocol (PDCP) 314 layer, and a service data adaptation protocol (SDAP) layer 316, which are terminated at the base station on the network side. Although not shown, the UE may have several upper layers above the L2 layer 308 including at least one network layer (e.g., IP layer and user data protocol (UDP) layer) that is terminated at the User Plane Function (UPF) on the network side and one or more application layers.

The SDAP layer 316 provides a mapping between a 5G core (5GC) quality of service (QoS) flow and a data radio bearer and performs QoS flow ID marking in both downlink and uplink packets. The PDCP layer 314 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames and other unstructured data (i.e., Machine-Type Communication (MTC), hereinafter collectively referred to as "packets"). The PDCP layer 314 also provides header compression for upper layer data packets to reduce radio transmission overhead, security by ciphering the data packets, and integrity protection of data packets. The RLC layer 312 provides segmentation and reassembly of upper layer data packets, error correction through automatic repeat request (ARQ), and sequence numbering independent of the PDCP sequence numbering. The MAC layer 310 provides multiplexing between logical and transport channels. The MAC layer 310 is also responsible for allocating the various radio resources (e.g., resource blocks) in one cell among the UEs and for HARQ operations. The physical layer 306 is responsible for transmitting and receiving data on physical channels (e.g., within slots).

In the control plane, the radio protocol architecture for the UE and base station is substantially the same for L1 306 and L2 308 with the exception that there is no SDAP layer in the control plane and there is no header compression function for the control plane. The control plane also includes a radio resource control (RRC) layer 318 in L3 and a higher Non Access Stratum (NAS) layer 320. The RRC layer 318 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non Access Stratum (NAS). The RRC layer 318 is further responsible for QoS management, mobility management (e.g., handover, cell selection, inter-RAT mobility), UE measurement and reporting, and security functions. The NAS layer 320 is terminated at the AMF in the core network and performs various functions, such as authentication, registration management, and connection management.

Figure 4:
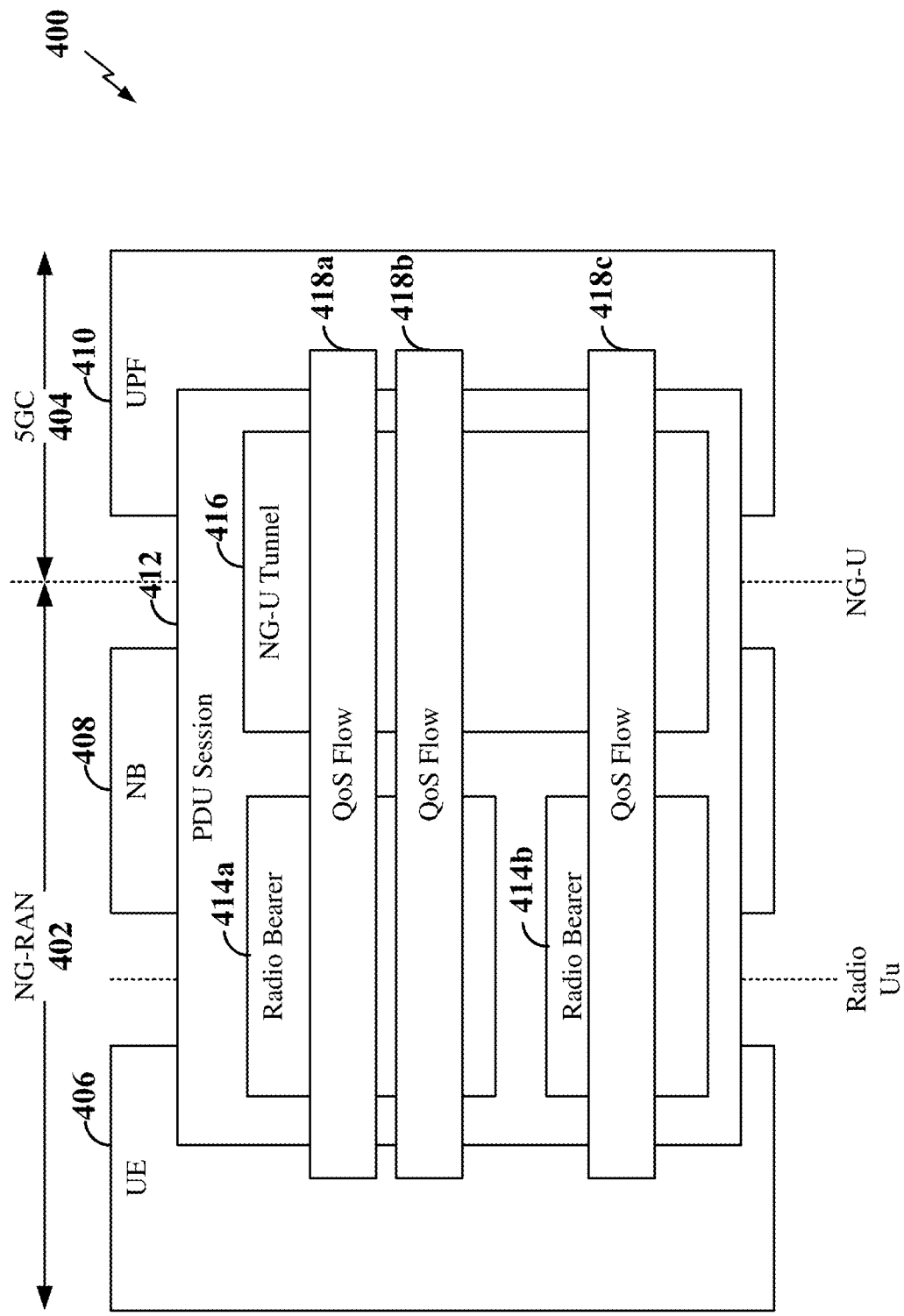
FIG. 4 is a diagram illustrating an exemplary Quality of Service (QoS) architecture that facilitates aspects disclosed herein.

Various aspects of the disclosure are generally directed towards utilizing the SDAP layer to facilitate QoS flow remapping from one data radio bearer (DRB) to another DRB. Referring to FIG. 4, a diagram illustrating an exemplary QoS architecture 400 that facilitates aspects disclosed herein is provided. In some examples, the QoS architecture 400 is implemented within a next generation RAN (e.g., NG-RAN) 402, both for New Radio (NR) connected to a 5G core network (5GC) 404 and for E-UTRA connected to the 5GC. The NG-RAN 402 includes a user equipment (UE) 406 and a Node B (e.g., a next generation (ng)-eNB or gNB) 408, while the 5GC includes a user plane function (UPF) 410. The 5GC 404 may further include other core network nodes (not shown), such as a core access and mobility management function (AMF), a session management function (SMF), and a policy control function (PCF).

For each UE (e.g., UE 406), the 5GC 404 establishes one or more PDU Sessions 412. Each PDU session 412 may include one or more data flows 418a-418c (e.g., IP, Ethernet and/or unstructured data flows), each associated with a set of one or more applications. The 5GC 404 may further select a QoS to be associated with each of the data flows 418a-418c within the PDU session 412. At the NAS level, the QoS flow is the finest granularity of QoS differentiation in a PDU session and is characterized by both a QoS profile provided by the 5GC 404 to the NB 408 and QoS rule(s) provided by the 5GC 404 to the UE 406. The QoS profile is used by the NB 408 to determine the treatment on the radio interface, while the QoS rules dictate the mapping between uplink User Plane traffic and QoS flows 418a-418c to the UE 406.

The QoS profile may include one or more QoS parameters. For example, the QoS profile may include an allocation and retention priority (ARP), which may indicate the priority level for the allocation and retention of data radio bearers, and a 5G QoS Identifier (5QI), which is associated with particular 5G QoS characteristics. Examples of 5G QoS characteristics may include a resource type (e.g., Guaranteed Bit Rate (GBR), delay critical GBR, or non-GBR), a priority level, a packet delay budget, a packet error rate, an averaging window, and a minimum data burst volume. For GBR QoS flows, the QoS profile may further specify a guaranteed flow bit rate (GFBR) for both uplink and downlink, a maximum flow bit rate (MFBR) for both uplink and downlink, and a maximum packet loss rate for both uplink and downlink. For non-GBR QoS flows, the QoS profile may include a reflective QoS attribute (RQA). The RQA, when included, indicates that some (not necessarily all) traffic carried on this QoS flow is subject to reflective QoS (RQoS) at the NAS layer. Standardized or pre-configured 5G QoS characteristics are derived from the 5QI value and are not explicitly signaled. Signaled QoS characteristics are included as part of the QoS profile.

In addition, an Aggregate Maximum Bit Rate is associated with each PDU session 412 (Session-AMBR) and with each UE 406 (UE-AMBR). The Session-AMBR limits the aggregate bit rate that can be expected to be provided across all Non-GBR QoS Flows for a specific PDU Session 412. The UE-AMBR limits the aggregate bit rate that can be expected to be provided across all Non-GBR QoS Flows of a UE.

The NB 408 establishes one or more Data Radio Bearers (DRB) 414a and 414b per PDU Session 412. The NB 408 further maps packets belonging to different PDU sessions 412 to different DRBs. Here, the NB 408 establishes at least one default DRB (e.g., DRB 414a) for each PDU Session 412. At the Access Stratum (AS) level, the DRB defines the packet treatment on the radio interface (Uu). A DRB serves packets with the same packet forwarding treatment. Separate DRBs may be established for QoS flows requiring different packet forwarding treatment, or several QoS flows belonging to the same PDU session can be multiplexed in the same DRB. Within each PDU session 412, the NB 408 determines how to map multiple QoS flows to a DRB. For example, the NB 408 may map a GBR flow and a non-GBR flow, or more than one GBR flow to the same DRB. The timing of establishment of non-default DRB(s) (e.g., DRB 414b) between the NB 408 and UE 406 for QoS flow(s) configured during establishing a PDU session can be different from the time when the PDU session is established.

The NG-RAN 402 and 5GC 404 ensure quality of service (e.g. reliability and target delay) by mapping packets to appropriate QoS Flows 418a-418c and DRBs 414a and 414b. The NAS layer performs packet filtering in both the UE 406 and in the 5GC 404 to associate uplink (UL) and downlink (DL) packets with QoS Flows 418a-419c. The AS layer, which is a functional layer between the UE 406 and the NB 408, implements mapping rules in the UE 406 and in the NB 408 to associate UL and DL QoS flows 418a-418c with DRBs 414a and 414b. Hence, there is a two-step mapping of IP flows to QoS flows (in the NAS) and from QoS flows to DRBs (in the AS). In the example shown in FIG. 4, QoS flows 418a and 418b are mapped to DRB 414a, while QoS flow 418c is mapped to DRB 414b.

Each QoS flow 418a-418c is identified within the PDU session 412 by a QoS Flow ID (QFI) carried in an encapsulation header over a next generation tunnel (NG-U tunnel) 416 provided on an interface between the NB 408 and the UPF 410 (NG-U). The QoS flow to DRB mapping by NB 408 is based on the QFI and the associated QoS profiles (i.e. QoS parameters and QoS characteristics). For example, in the uplink, the NB 408 may control the mapping of QoS Flows 418a-418c to DRBs 414a and 414b using reflective mapping or explicit configuration. In reflective mapping, for each DRB 414a and 414b, the UE 406 monitors the QFI(s) of the downlink packets and applies the same mapping in the uplink That is, for a DRB (e.g., DRB 414a), the UE 406 maps the uplink packets belonging to the QoS flows(s) 418a and 418b corresponding to the QFI(s) and PDU Session 412 observed in the downlink packets for that DRB 414a. To enable this reflective mapping, the NB 408 marks downlink packets over the radio interface (Uu) with the QFI. In explicit configuration, the NB 408 may configure by RRC an uplink "QoS Flow to DRB mapping." The UE 406 may apply the latest update of the mapping rules regardless of whether the update is performed via reflecting mapping or explicit configuration.

In the downlink, the QFI is signaled by the NB 408 over the radio interface (Uu) for the purpose of RQoS, and if neither the NB 408, nor the NAS (as indicated by the RQA), intend to use reflective mapping for the QoS flow(s) carried in a DRB, no QFI is signaled for that DRB over Uu. However, the NB 408 can configure the UE 406 to still signal the QFI over Uu. As indicated above, for each PDU session 412, a default DRB (e.g., DRB 414a) is configured. If an incoming UL packet matches neither an RRC configured nor a reflective configured "QoS Flow ID to DRB mapping," the UE 406 may map the UL packet to the default DRB 414a of the PDU session 412.

Figure 5:
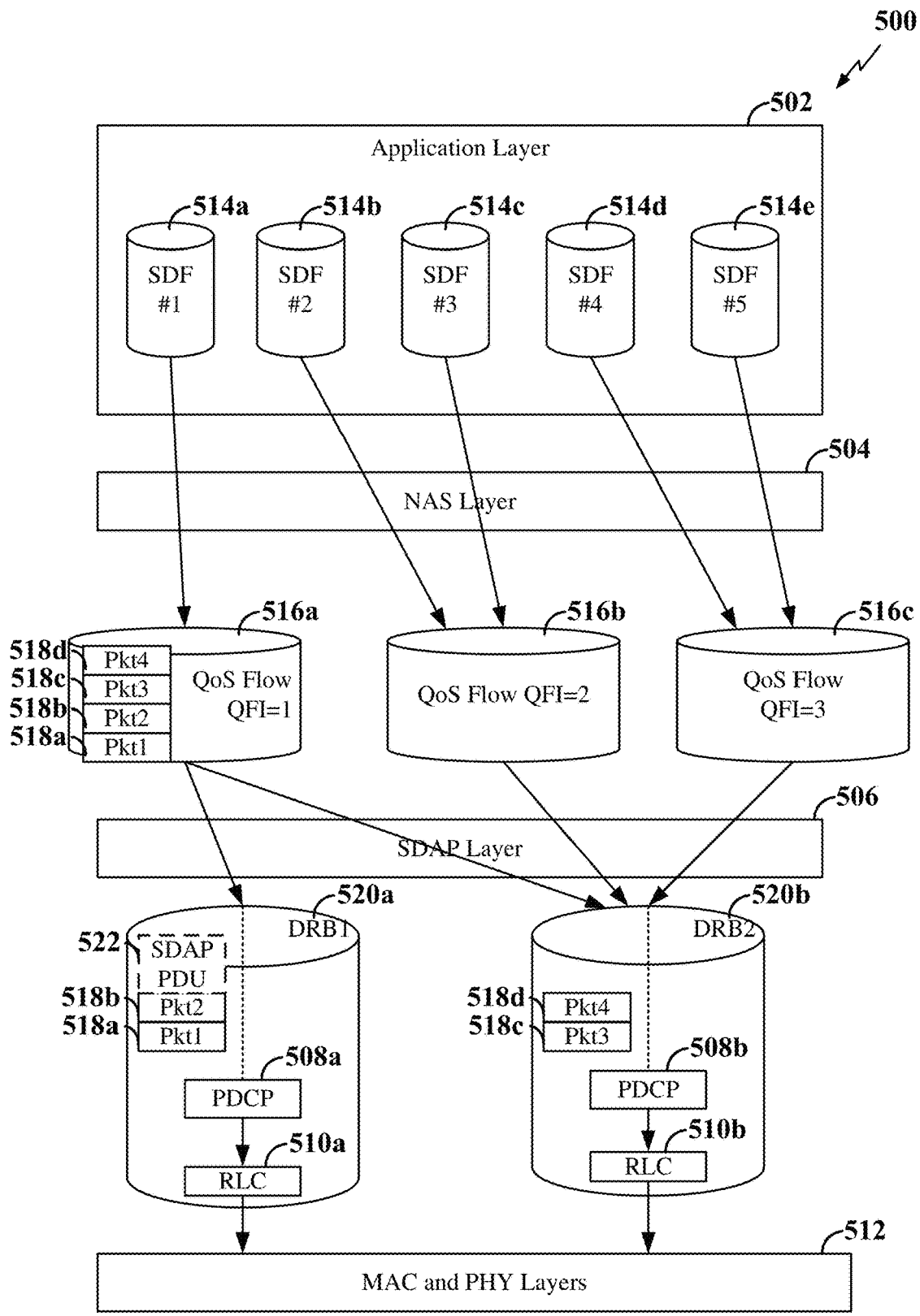
FIG. 5 is a diagram illustrating an exemplary remapping of a QoS flow from a first data radio bearer (DRB) to a second DRB.

FIG. 5 is a diagram illustrating an exemplary remapping of a QoS flow from a first data radio bearer (DRB) to a second DRB. FIG. 5 provides an example from a UE perspective that shows a 5G uplink mapping relationship 500 for a single PDU session as part of QoS enforcement. Although a single PDU session is illustrated in FIG. 5, it should be appreciated that a UE may have multiple PDU sessions. Each PDU session of a UE may have multiple DRBs, each DRB may have multiple QoS flows (e.g., where each QoS flow is identified by a QFI), and each QFI may contain multiple SDFs.

FIG. 5 further illustrates the UE protocol stack and the processing of uplink packets from Service Data Flows (SDFs) 514a-514e associated with the PDU session. For ease of understanding, a Service Data Flow (SDF) may be conceptually viewed as the data/packets/frames from one set of applications on a wireless communication device (e.g., a UE).

In the example shown in FIG. 5, an Application layer 502, a NAS layer 504, an SDAP layer 506, PDCP layers 508a and 508b, RLC layers 510a and 510b, and MAC and PHY layers 512 are illustrated in the protocol stack. The NAS layer 504 and SDAP layer 506 may correspond, for example, to the NAS layer 320 and SDAP layer 316 shown in FIG. 3. In addition, the PDCP layers 508a and 508b may correspond to the PDCP layer 314, whereas the RLC layers 510a and 510b may correspond to the RLC layer 312 shown in FIG. 3. Furthermore, the MAC and PHY layers 508 may correspond, for example, to the MAC layer 310 and Physical layer 306 shown in FIG. 3. PDCP layers 508a and 508b each correspond to a respective PDCP entity implemented within a respective DRB 520a and 520b, and RLC layers 510a and 510b each correspond to a respective RLC entity implemented within a respective DRB 520a and 520b Upon establishment of the PDU session, the UE may be configured (e.g., using a control message from the NB) to map a first QoS flow (QFI=1) 516a to DRB1 520a. The UE may further be configured to map a second QoS flow (QFI=2) 516b to DRB2 520b and a third QoS flow (QFI=3) to DRB2 520b. The NAS layer 504 may then perform packet filtering to associate UL packets with QoS Flows. For example, the NAS layer 504 may associate packets from SDF #1 514a to the first QoS flow 516a, packets from SDF #2 514b and SDF #3 514c to the second QoS flow 516b, and packets from SDF #4 514d and SDF #5 514e to the third QoS flow 516c.

In the example shown in FIG. 5, SDF #1 514a generates four UL packets (Pkt1 518a, Pkt2 518b, Pkt3 518c, and Pkt4 518d). When UL packets 1 and 2 (Pkt1 518a and Pkt2 518b) associated with the first QoS flow 516a arrive at the SDAP layer 506, the SDAP layer 506 maps Pkt1 518a and Pkt2 518b to DRB1 520a according to the network configuration of the UE described above. Prior to the SDAP receiving UL packets 3 and 4 (Pkt3 518c and Pkt4 518d), the network (e.g., NB via explicit or reflective mapping) re-configures the UE to map the first QoS flow 516a to DRB2 520a. Then, when UL packets 3 and 4 (Pkt 3 518c and Pkt 4 518d) of the first QoS flow 516a arrive at the SDAP layer 506, the SDAP layer 506 maps Pkt3 518c and Pkt4 518d to DRB2 520b according to the new network configuration of the UE.

In some examples, each DRB 520a and 520b may be able to guarantee that the packets within the DRB are received by the receiver (e.g., the NB) in their original order, because the PDCP entity (here, entity is an instance of a "protocol layer") of each DRB will tag a sequence number to each packet. Each DRB's PDCP entity maintains its own PDCP sequence number (SN), independent of other DRB's PDCP entity. For example, the PDCP entity 508a of DRB1 520a may tag Pkt1 518a with PDCP sequence number SN=901 and Pkt2 518b with PDCP sequence number SN=902. In addition, the PDCP entity 508b of DRB2 520b may tag Pkt3 518c with PDCP sequence number SN=1 and Pkt4 518d with PDCP sequence number SN=2. However, the MAC and PHY layers 512 may not be able to guarantee in-order delivery at the receiver side. For example, Pkt3 518c and Pkt4 may be received by the receiver before Pkt1 518a and Pkt2 518b.

Therefore, when the receiver receives the four packets 518a-518b, the receiver is aware that the packets 518a-518d belong to the same QoS flow (e.g., due to the QFI). However, the receiver may not be able to recover the original order of the packets 518a-518d at the UE's Application layer 502 as a result of the different PDCP sequence numbers arising from the remapping from DRB1 520a to DRB2 520b between the second packet (Pkt2 518b) and the third packet (Pkt3 518c). In particular, the receiver may not be able to discern when packets from DRB1 520a end and packets from DRB2 520b begin. For example, there may be an intermediate time period within which the receiver may receive packets from both DRB1 520a and DRB2 520b due to lower layer (e.g., RLC layer, MAC layer) retransmissions.

In addition, the SDAP layer 506 does not include sequence numbers in SDAP PDUs provided to the PDCP entities 508a and 508b, and as a result, the receiver is not able to perform reordering of SDAP PDUs in circumstances in which the receiver is unable to perform reordering of PDCP PDUs due to remapping of a QoS flow from one DRB to another DRB.

Therefore, various aspects of the disclosure provide mechanisms to ensure that the receiver is able to recorder the original order of packets generated at the transmitter. In some examples, the SDAP layer 506 may generate a standalone SDAP PDU 522 that includes control information containing an indication that a final SDAP data PDU associated with a QoS flow (e.g., QoS flow 516a) has been transmitted on the old DRB (e.g., DRB1 520a) upon detection of a remapping configuration change (e.g., remapping QoS flow 516a from DRB1 520a to DRB2 520b). Such detection may, for example, be based on a Radio Resource Control (RRC) message or reflective mapping.

The SDAP PDU 522 may therefore, be considered an SDAP control PDU functioning as an "end marker" SDAP PDU in the SDAP layer 506. The SDAP layer 506 may generate the SDAP control PDU 522 after transmitting the last/final SDAP data PDU (e.g., Pkt2 518b) for QoS flow 516a to DRB1 520a. The SDAP control PDU 522 may also be provided to the old DRB (e.g., DRB1 520a) and processed by the PDCP entity 508a to preserve the order of the end marker SDAP control PDU 522. Using the example above, the SDAP control PDU 522 may be assigned the next PDCP sequence number (e.g., SN=903) by the PDCP entity 508a. Thus, the order of packets may be preserved by the PDCP entity 508a, so that when the receiver receives the SDAP control PDU 522, the receiver is aware that all of the packets for first QoS flow 516a on DRB1 520a have been received and processed. As such, the end marker SDAP PDU 522 may be utilized by an SDAP entity at the receiver (e.g., UE) to indicate that the SDAP entity should stop the mapping of SDAP session data units (SDUs) of the QoS flow 516a indicated by the QFI to the DRB (e.g., DRB1 520a) on which the end marker SDAP PDU 522 is transmitted.

It should be noted that the PDCP entity 508a is unable to differentiate a SDAP control PDU from a SDAP data PDU, and therefore, both types of SDAP PDUs may be handled in the same way by the PDCP entity 508a, thus allowing the PDCP entity 508a to process the SDAP control PDU and preserve the order of all SDAP PDUs, as discussed above. Since all packets within one DRB may be able to be received in order at the PDCP layer on the receiver side, when the receiver receives the SDAP control PDU, the receiver may determine that all packets on the old DRB (DRB1 520a) have been received. Therefore, upon receiving the SDAP control PDU, the receiver may forward the remapped packets (e.g., Pkt3 518c and Pkt4 518d) received on the new DRB (e.g., DRB2 520b) to the upper layer.

In some examples, the SDAP control PDU may include the QFI of the remapped QoS flow. For example, the SDAP layer 506 may set the "QFI" of the SDAP control PDU to the QFI of the remapped QoS flow (e.g., QFI=1). In addition, the SDAP control PDU may include a control identifier to differentiate an SDAP control PDU (which includes control messages generated by the SDAP layer) from an SDAP data PDU (which includes application data, for example). In one example, the value of the control identifier may be set differently for an SDAP control PDU and a SDAP data PDU (i.e., where the SDAP layer sets the identifier of an SDP control PDU to indicate that the PDU is an "SDAP control PDU"). For example, the control identifier may include a one bit "Data/Control (D/C)" identifier (e.g., D/C parameter=0, indicates SDAP control PDU, whereas D/C parameter=1 indicates SDAP data PDU).

In other examples, when a remapping configuration is executed by a transmitter (e.g., a UE) as indicated FIG. 5, the transmitter may first determine whether there are any un-transmitted packets (e.g., packets not yet processed by the SDAP layer 506) belonging to the old DRB (e.g., DRB1 520a) waiting, for example, in a transmit buffer associated with the SDAP layer 506. If there is at least one un-transmitted packet belonging to the old DRB (e.g., DRB1 520a), the SDAP layer 506 may set an end marker parameter in the last un-transmitted packet belonging to DRB1 520a. Otherwise, if there are no remaining un-transmitted packets, the SDAP layer 506 may generate the end marker SDAP control PDU 522.

In this example, the SDAP layer 506 may set an end marker parameter in the SDAP header of the last data packet of a QFI (e.g., the first QoS flow 516a) that is mapped to the old DRB1 520a. For example, assuming that upon detection of a remapping configuration change (e.g., remapping QoS flow 516a from DRB1 520a to DRB2 520b), SDF #2 has generated Pkt1 518a and Pkt2 518b, but has not yet generated Pkt3 518c or Pkt4 518d, the SDAP layer 506 may set an end marker parameter in the SDAP header of the SDAP data PDU containing Pkt2 518b. In some examples, the end marker parameter may include a one bit end marker parameter (e.g., end marker parameter=0, indicates the SDAP PDU is not the last/final SDAP data PDU for a DRB, whereas end marker parameter=1 indicates the SDAP PDU is the last/final SDAP data PDU for a DRB).

Based on the end marker parameter, the receiver SDAP entity may consider all packets of the remapped QFI from the old DRB1 520a (e.g., Pkt1 518a and Pkt2 518b) as being received prior to any packets of the remapped QFI from the new DRB2 520b (e.g., Pkt3 518c and Pkt4 518d), regardless of whether the old DRB1 packets are actually received before or after the new DRB packets. However, if the receiver PDCP entity does not receive and deliver the packet with the end marker parameter in the SDAP header for the remapped QFI from the old DRB 1 (i.e., Pkt2 518b) to the receiver SDAP layer, the receiver SDAP layer is not able to deliver any received packets of the remapped QFI from the new DRB2 520b to the upper layer (in Example 1, these packets are Packets #3 and #4).

In this example, the complexity for implementation is higher than in the example in which an SDAP control PDU is generated upon detection of the remapping. However, by allowing the SDAP layer to generate the SDAP control PDU when there are no un-transmitted packets waiting in the buffer, the transmitter is able to perform the remapping right away, instead of waiting for the next SDAP data PDU to include the end marker parameter. Moreover, if an old DRB (e.g., DRB1 520a) is not needed for other flows, by generating the SDAP control PDU when there are no un-transmitted packets, the old DRB can be released sooner than if the SDAP layer needed to wait for the next SDAP data PDU to include the end marker parameter.

In other examples, at the time the network configures a remapping of a QoS flow (e.g., QFI=1 514a) from DRB1 520a to DRB2 520b, if there are no more unprocessed packets available on the old DRB1 520a (e.g., all existing packets have already been processed by the SDAP layer 506, even though they may have not been sent over the air and may still buffered by lower layers, such as the PDCP layer 508a), when a new incoming packet of the remapped QFI (e.g., QFI=1 516a) arrives at the SDAP layer 506, the SDAP layer 506 may set the end marker parameter in the first new incoming packet from the remapped QFI 516a. The SDAP layer 506 may then transmit the packet containing the end marker parameter on the old DRB (e.g., DRB1 520a). The SDAP layer 506 may then send subsequent incoming packets of the remapped QFI on the new DRB (e.g., DRB2 520b) without setting the end marker.

Figure 6:
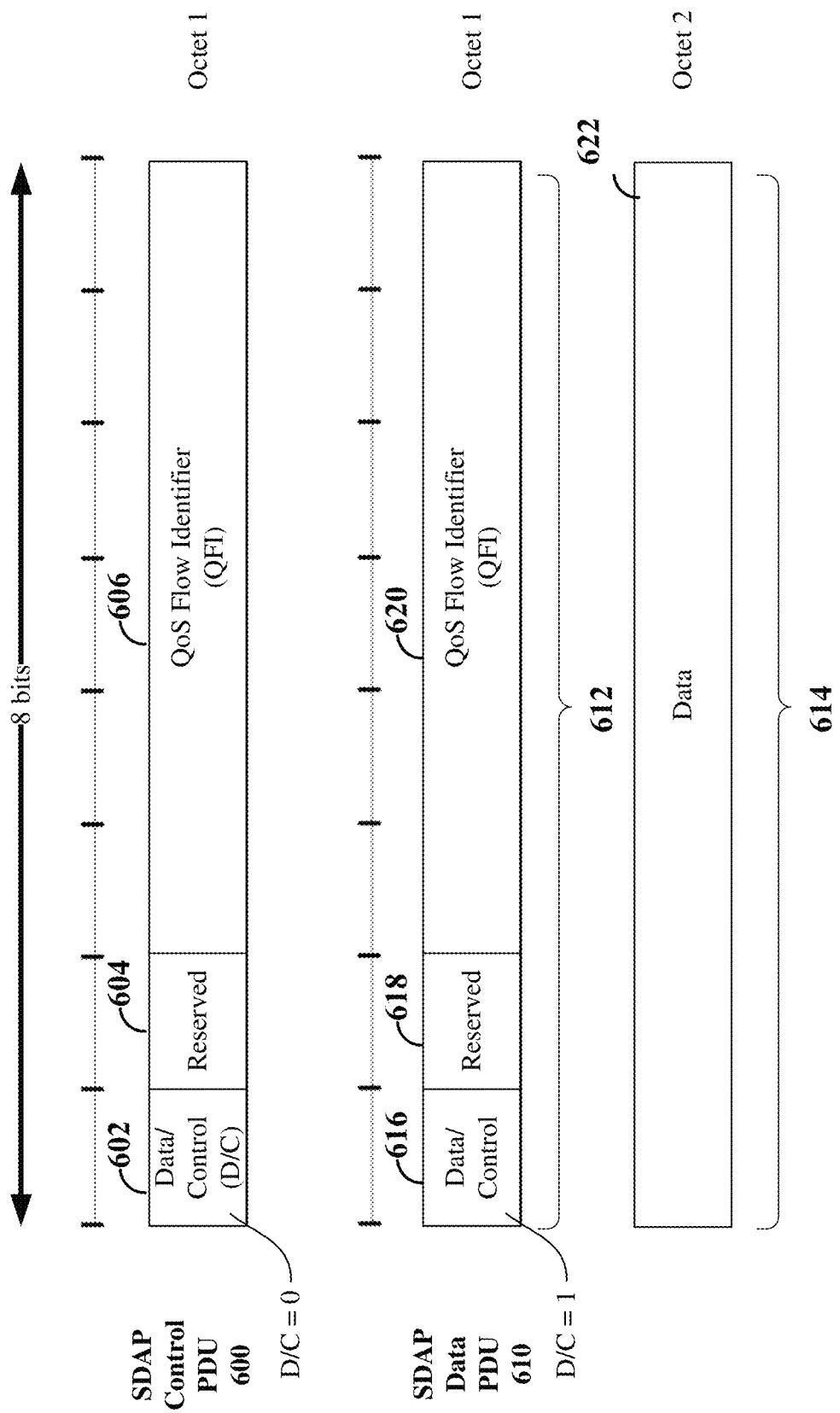
FIG. 6 is a diagram illustrating an exemplary Service Data Adaptation Protocol (SDAP) control protocol data unit (PDU) and an SDAP data PDU.

An example of a SDAP control PDU 600 and a SDAP data PDU 610 are illustrated in FIG. 6. As illustrated, the SDAP control PDU 600 is configured to have a total length of 8 bits at the SDAP layer. The SDAP control PDU 600 includes a data/control (D/C) bit 602 indicating whether the SDAP control PDU 600 is an SDAP data PDU or an SDAP control PDU. For example, the D/C bit 602 may be set to zero to indicate that the SDAP control PDU 600 is an SDAP control PDU. The SDAP control PDU 600 may further include a reserved field 604 and may further include a QFI parameter 606 identifying a particular QoS flow applicable to the control information (e.g., the D/C bit 602) in the SDAP control PDU 600. For example, the QFI parameter may be set to a value corresponding to the QoS flow that has been remapped from one DRB to another DRB.

The SDAP data PDU 610 includes an SDAP header 612 within a first Octet (Octet 1) that has a total length of 8 bits. The SDAP header 612 may include, for example, a D/C bit 616, a reserved field 618, and a QFI parameter 620. The D/C bit 616 indicates whether the SDAP control PDU 600 is an SDAP data PDU or an SDAP control PDU. For example, the D/C bit may be set to one to indicate that the SDAP data PDU 610 is an SDAP data PDU. The QFI parameter 620 identifies a particular QoS flow associated with the SDAP data PDU 610. The SDAP data PDU 610 may further include a body 614 containing data 622 (e.g., application data) that may start from Octet 2, as illustrated, and can have variable length.

Figure 7:
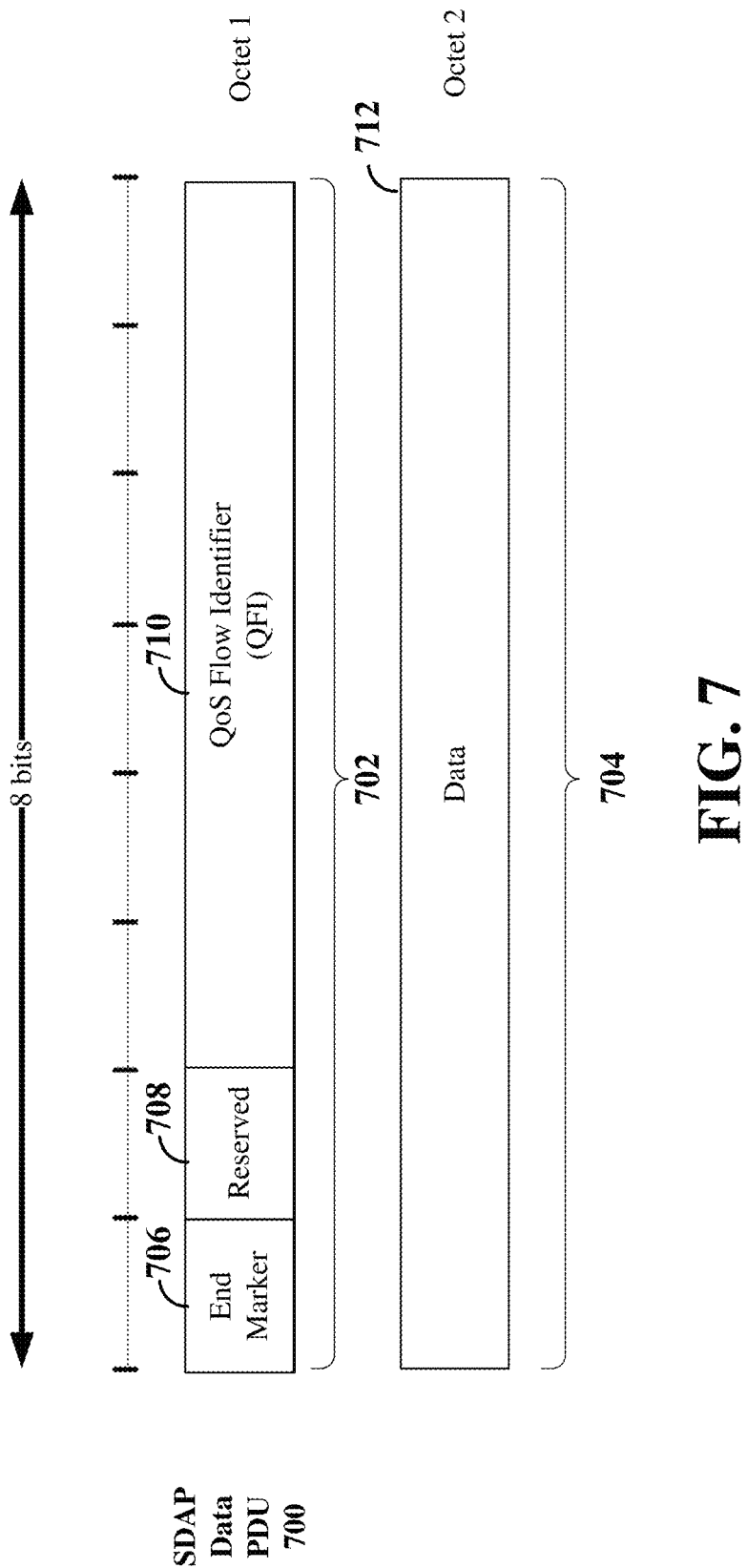
FIG. 7 is a diagram illustrating another exemplary SDAP data PDU.

FIG. 7 illustrates another example of an SDAP data PDU 700. As illustrated, the SDAP data PDU 700 includes an SDAP header 702 within a first Octet (Octet 1) that has a total length of 8 bits. The SDAP header 702 may include, for example, an end marker parameter 706, a reserved field 708, and a QFI parameter 710. The end marker parameter 706 indicates whether the SDAP data PDU is the last/final SDAP data PDU for a DRB. For example, the end marker parameter 706 may include a single end marker bit, where end marker parameter=0 indicates the SDAP data PDU is not the last/final SDAP data PDU for a DRB, and end marker parameter=1 indicates the SDAP data PDU is the last/final SDAP data PDU for a DRB. The QFI parameter 710 identifies a particular QoS flow associated with the SDAP data PDU 700. The SDAP data PDU 700 may further include a body 704 containing data 712 (e.g., application data) that may start from Octet 2, as illustrated, and can have variable length.

Figure 8:
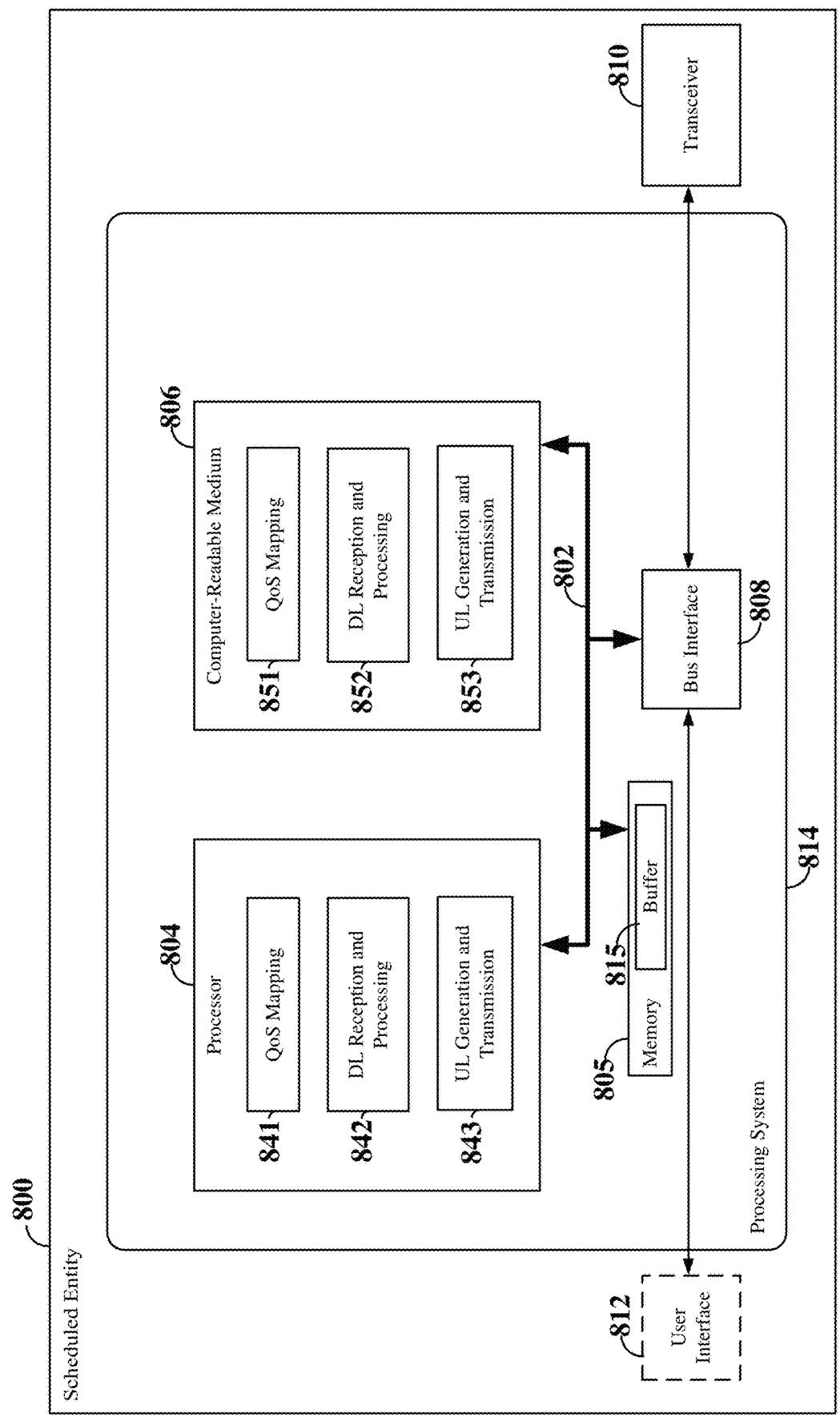
FIG. 8 is a block diagram illustrating an example of a hardware implementation for a scheduled entity employing a processing system.

FIG. 8 is a block diagram illustrating an example of a hardware implementation for a scheduled entity 800 employing a processing system 814. For example, the scheduled entity 800 may be a user equipment (UE) as illustrated in any one or more of the FIGS. 1, 2 and/or 4 disclosed herein.

The scheduled entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 800 may be configured to perform any one or more of the functions described herein. That is, the processor 804, as utilized in a scheduled entity 800, may be used to implement any one or more of the processes and processes described below. The processor 804 may in some instances be implemented via a baseband or modem chip and in other implementations, the processor 804 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also optionally be provided.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. In some examples, the computer-readable medium 806 may be part of the memory 805. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include QoS mapping circuitry 841 configured for various functions, including, for example, to utilize the Service Data Adaptation Protocol (SDAP) layer to facilitate Quality of Service (QoS) flow remapping, as described herein. The QoS mapping circuitry 841 may be configured to detect a mapping reconfiguration of a first QoS flow from a first data radio bearer (DRB) to a second DRB. For example, the QoS mapping circuitry 841 may be configured to detect the mapping reconfiguration via a Radio Resource Control (RRC) message transmitted from a base station or via reflective mapping, where the mapping reconfiguration is detected based on whether packets associated with the first QoS flow are received from the base station via the second DRB after being initially received via the first DRB The QoS mapping circuitry 841 may further be configured to generate an SDAP control protocol data unit (PDU) in response to the mapping reconfiguration, in which the SDAP control PDU provides an indication that a final SDAP data PDU associated with the first QoS flow has been transmitted on the first DRB. In some examples, the SDAP control PDU may be configured to be readily distinguishable from an SDAP data PDU. For example, the QoS mapping circuitry 841 may be configured to include a control identifier within the SDAP control PDU to facilitate a distinction between an SDAP control PDU and an SDAP data PDU. In a particular implementation, the QoS mapping circuitry 841 may be configured to include a data/control (D/C) bit in each of the SDAP control PDU and an SDAP data PDU, where the D/C bit facilitates the distinction between the SDAP control PDU and the SDAP data PDU.

The QoS mapping circuitry 841 may further be configured to include a QoS Flow Identifier (QFI) parameter within the SDAP control PDU. The QFI parameter may identify a particular QoS flow applicable to control information included in the SDAP control PDU. For example, the QoS mapping circuitry 841 may be configured to set the QFI parameter within the SDAP control PDU to a value corresponding to the first QoS flow. The QoS mapping circuitry 841 may further be configured to preserve an order in which a transmitter side SDAP layer transmits the SDAP control PDU after transmitting the final SDAP data PDU associated with the first QoS flow via the first DRB. In some examples, preserving the order facilitates having a receiver side SDAP layer receive the SDAP control PDU after receiving the final SDAP data PDU associated with the first QoS flow via the first DRB. For example, the QoS mapping circuitry 841 may be configured to preserve such order by utilizing a Packet Data Convergence Protocol (PDCP) entity associated with the first DRB.

The QoS mapping circuitry 841 may be further configured to generate the SDAP control PDU based on whether an un-transmitted SDAP data PDU is associated with the first QoS flow. In some examples, the un-transmitted SDAP data PDU may be within a transmit buffer 815 associated with the SDAP layer, which may be included, for example, in memory 805. For example, the QoS mapping circuitry 841 may be configured to include an end marker parameter in an SDAP header of the un-transmitted SDAP data PDU instead of generating the SDAP control PDU. The end marker parameter may indicate that the un-transmitted SDAP data PDU is the final SDAP data PDU associated with the first QoS flow on the first DRB.

In other examples, the QoS mapping circuitry 841 may further be configured to detecting a mapping reconfiguration of a first Quality of Service (QoS) flow from a first data radio bearer (DRB) to a second DRB and to set an end marker parameter in the header of a first SDAP data protocol data unit (PDU) received from an upper layer after the mapping reconfiguration. The end marker parameter provides an indication that the first SDAP data PDU is a final SDAP data PDU associated with the first QoS flow on the first DRB.

The processor 804 may further include DL reception and processing circuitry 842, configured to receive and process downlink data, control information, and other signals received within one or more subframes or slots. For example, the DL reception and processing circuitry 842 may be configured to receive, via the transceiver 810, an RRC message indicating a mapping reconfiguration of the first QoS flow from the first DRB to the second DRB. The DL reception and processing circuitry 842 may further be configured to receive, via the transceiver 810, packets associated with the first QoS flow via the second DRB after being initially received via the first DRB. The DL reception and processing circuitry 842 may further be configured to execute DL reception and processing software 852 stored in the computer-readable medium 806 to implement one or more of the functions described herein.

The processor 804 may further include UL generation and transmission circuitry 843, configured to generate and transmit data and control information within one or more subframes or slots. For example, the UL generation and transmission circuitry 843 may be configured to receive from the QoS mapping circuitry 841 an SDAP control PDU via the first DRB and to transmit, via the transceiver 810, the SDAP control PDU to a scheduling entity (e.g., a base station). The UL generation and transmission circuitry 843 may further be configured to receive from the QoS mapping circuitry 841 an SDAP data PDU including an end marker parameter indicating that the SDAP data PDU is the final SDAP data PDU associated with a QoS flow on a particular DRB, and to transmit, via the transceiver 810, the SDAP data PDU to a scheduling entity (e.g., a base station). The UL generation and transmission circuitry 843 may further be configured to execute UL generation and transmission software 853 stored in the computer-readable medium 806 to implement one or more of the functions described herein.

Figure 9:
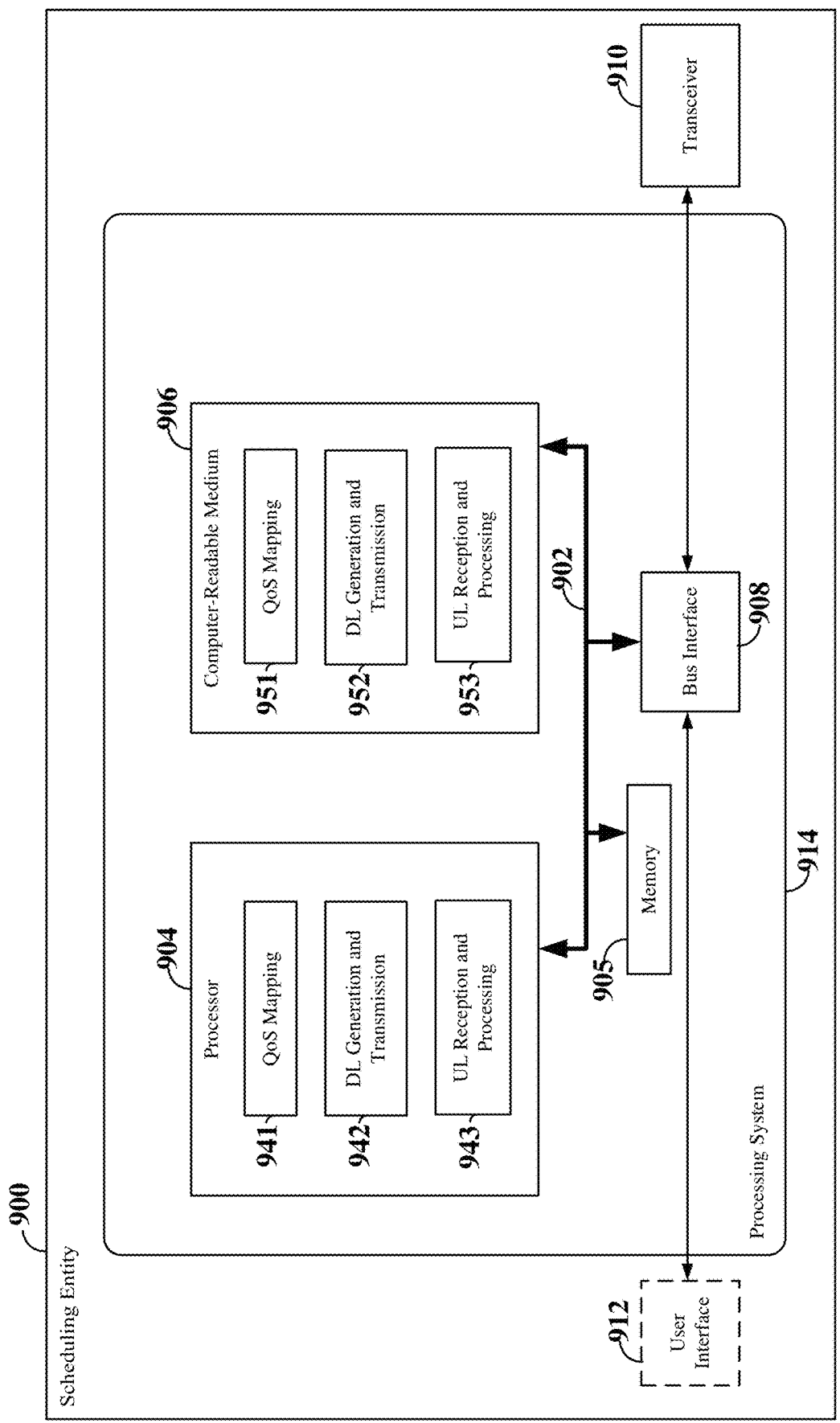
FIG. 9 is a block diagram illustrating an example of a hardware implementation for a scheduling entity employing a processing system.

FIG. 9 is a conceptual diagram illustrating an example of a hardware implementation for an exemplary scheduling entity 900 employing a processing system 914. In accordance with various aspects of the disclosure, an element, or any portion of an element, or any combination of elements may be implemented with a processing system 914 that includes one or more processors 904. For example, the scheduling entity 900 may be a base station as illustrated in any one or more of FIGS. 1, 2 and/or 4.

The processing system 914 may be substantially the same as the processing system 914 illustrated in FIG. 9, including a bus interface 908, a bus 902, memory 905, a processor 904, and a computer-readable medium 906. Furthermore, the scheduling entity 900 may include an optional user interface 912 and a transceiver 910 substantially similar to those described above in FIG. 9. That is, the processor 904, as utilized in a scheduling entity 900, may be used to implement any one or more of the processes described below.

In some aspects of the disclosure, the processor 904 may include QoS mapping circuitry 941 configured for various functions, including, for example, to utilize the Service Data Adaptation Protocol (SDAP) layer to facilitate Quality of Service (QoS) flow remapping, as described herein. In some examples, the QoS mapping circuitry 941 may be configured to receive at least one SDAP data PDU associated with a first QoS flow via a first DRB and at least one SDAP data PDU associated with the first QoS flow via a second DRB from a scheduled entity. In some examples, the QoS mapping circuitry 941 may further be configured to forward the at least one SDAP data PDU received via the second DRB to an upper layer in response to receiving an SDAP control PDU applicable to the first QoS flow via the first DRB that indicates that a final SDAP data PDU associated with the first QoS flow has been transmitted on the first DRB.

The QoS mapping circuitry 941 may further be configured to identify the SDAP control PDU based on a control identifier included within the SDAP control PDU and to identify the SDAP data PDU based on a control identifier included within an SDAP header of the SDAP data PDU. In some examples, the control identifier facilitates a distinction between the SDAP control PDU and an SDAP data PDU. For example, the QoS mapping circuitry 941 may be configured to identify the SDAP control PDU by ascertaining a value of a D/C bit in each of the SDAP control PDU and the SDAP data PDU, where the D/C bit facilitates the distinction between the SDAP control PDU and the SDAP data PDU.

The QoS mapping circuitry 941 may further be configured to identify a QoS Flow Identifier (QFI) parameter included in the SDAP control PDU. The QoS mapping circuitry 941 may then be further configured to apply control information of the SDAP control PDU only to a QoS flow identified by the QFI parameter included in the SDAP control PDU.

In other examples, the QoS mapping circuitry 941 may be configured to forward the at least one SDAP data PDU received via the second DRB to an upper layer in response to detecting an end marker parameter in an SDAP header of the at least one SDAP data PDU applicable to the first QoS flow and received via the first DRB. The QoS mapping circuitry 941 may further be configured to execute QoS mapping software 941 stored in the computer-readable medium 906 to implement one or more of the functions described herein.

The processor 904 may further include DL generation and transmission circuitry 942 configured to generate and transmit downlink data, control information, and other signals within one or more subframes or slots. For example, the DL generation and transmission circuitry 942 may be configured to transmit, via the transceiver 910, an RRC message indicating a mapping reconfiguration of the first QoS flow from the first DRB to the second DRB to the scheduled entity. The DL generation and transmission circuitry 942 may further be configured to transmit, via the transceiver 910, packets associated with the first QoS flow via the second DRB after being initially transmitted via the first DRB. The DL generation and transmission circuitry 942 may further be configured to execute DL generation and transmission software 952 stored in the computer-readable medium 906 to implement one or more of the functions described herein.

The processor 904 may further include UL reception and processing circuitry 943 configured to receive and process data and control information received within one or more subframes or slots. For example, the UL reception and processing circuitry 943 may be configured to provide an SDAP control PDU for the first QoS flow received from the scheduled entity via the first DRB to the QoS mapping circuitry 941. The UL reception and processing circuitry 943 may further be configured to provide an SDAP data PDU for the first QoS flow received from the scheduled entity on the first DRB to the QoS mapping circuitry 941. In some examples, the SDAP data PDU may include an end marker parameter indicating that the SDAP data PDU is the final SDAP data PDU associated with the first QoS flow on the first DRB. The UL reception and processing circuitry 943 may further be configured to provide an SDAP data PDU of the first QoS flow received from the scheduled entity on the second DRB to the QoS mapping circuitry 941. The UL reception and processing circuitry 943 may further be configured to execute UL reception and processing software 953 stored in the computer-readable medium 906 to implement one or more of the functions described herein.

Figure 10:
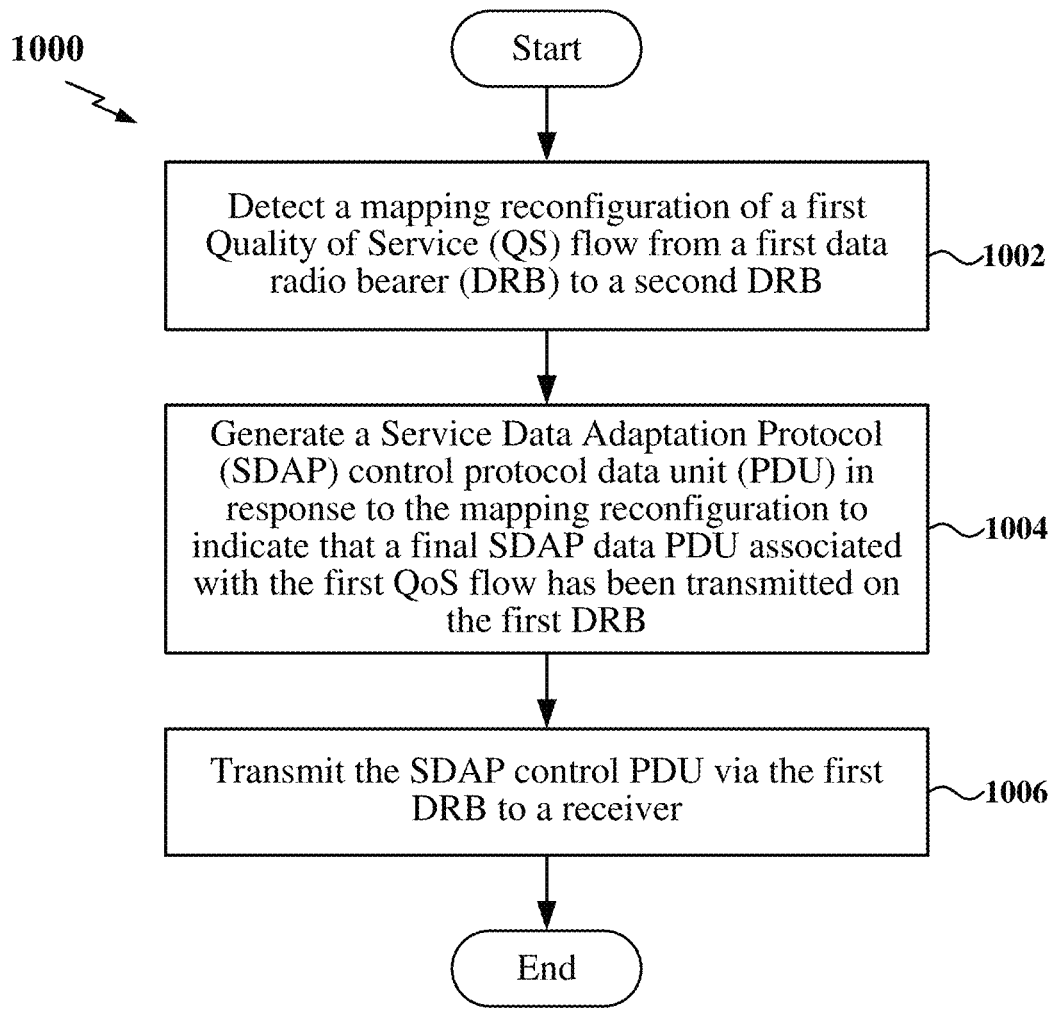
FIG. 10 is a flow chart illustrating an exemplary process for facilitating QoS flow remapping.

FIG. 10 is a flow chart illustrating an exemplary process 1000 for facilitating QoS flow remapping in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduled entity 800 illustrated in FIG. 8. In some examples, the process 1000 may be carried out by any suitable apparatus or means for carrying out the functions or algorithm described below.

At block 1002, the scheduled entity may detect a mapping reconfiguration of a first QoS flow from a first DRB to a second DRB. In some examples, the scheduled entity may detect the mapping reconfiguration via a RRC message from a scheduling entity in wireless communication with the scheduled entity. In other examples, the scheduled entity may detect the mapping reconfiguration via reflective mapping, in which the mapping reconfiguration is detected based on whether packets associated with the first QoS flow are received from the scheduling entity via the second DRB after being initially received via the first DRB. For example, the QoS mapping circuitry 841, together with the DL reception and processing circuitry 842, shown and described above in reference to FIG. 8 may detect the mapping reconfiguration.

At block 1004, the scheduled entity may generate an SDAP control PDU in response to the mapping reconfiguration to indicate that a final SDAP data PDU associated with the first QoS flow has been transmitted on the first DRB. In some examples, the SDAP control PDU may include a control identifier facilitating a distinction between the SDAP control PDU and an SDAP data PDU. For example, the control identifier may include a data/control (D/C) bit in each of the SDAP control PDU and the SDAP data PDU, where the D/C bit facilitates the distinction between the SDAP control PDU and the SDAP data PDU. In some examples, the SDAP control PDU may further include a QoS Flow Identifier (QFI) parameter identifying the first QoS flow. For example, the QoS mapping circuitry 841 shown and described above in reference to FIG. 8 may generate the SDAP control PDU.

At block 1006, the scheduled entity may transmit the SDAP control PDU via the first DRB to a receiver (e.g., the scheduling entity). For example, the UL generation and transmission circuitry 843, together with the transceiver 810, shown and described above in reference to FIG. 8 may transmit the SDAP control PDU to the receiver.

Figure 11:
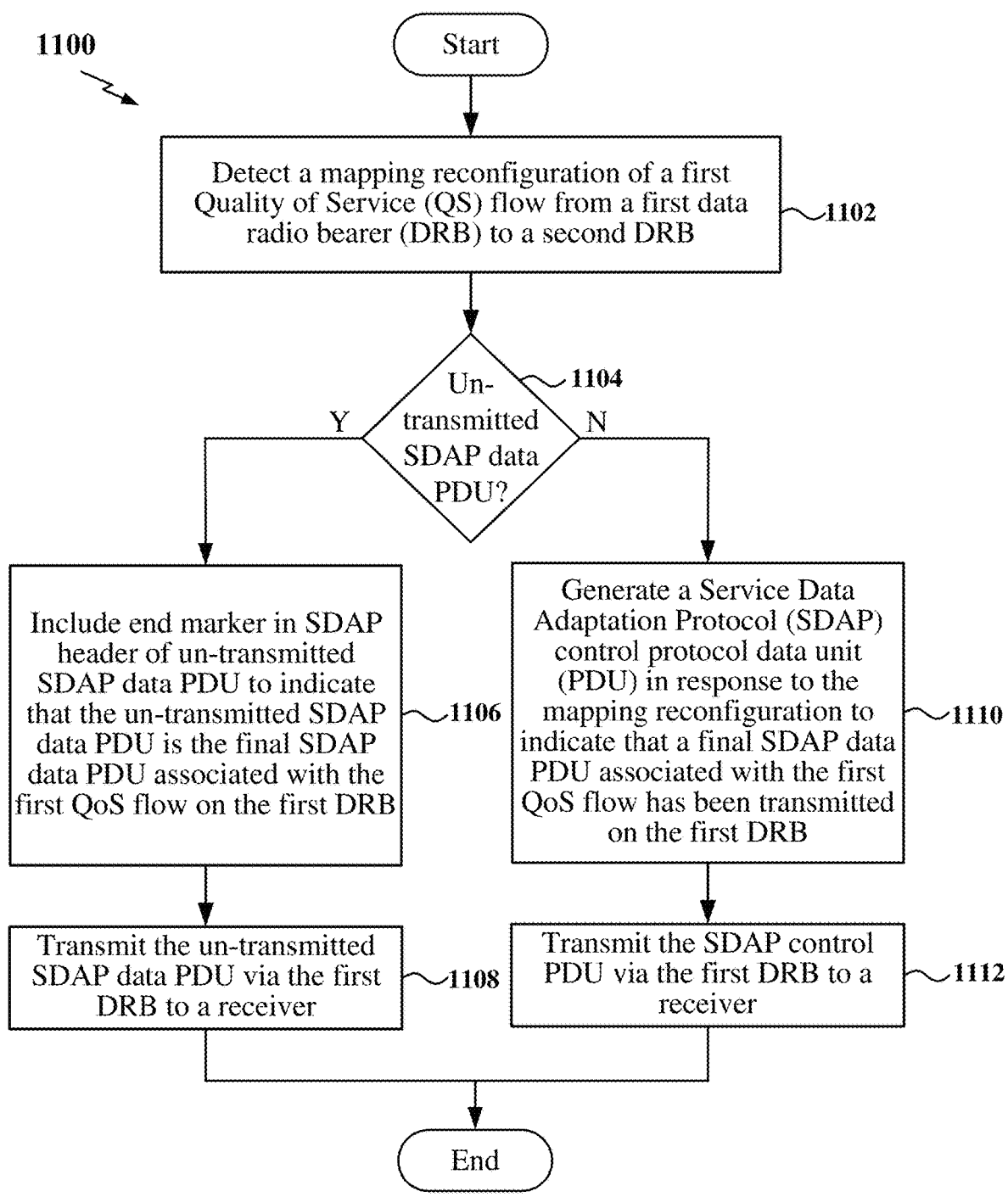
FIG. 11 is a flow chart illustrating another exemplary process for facilitating QoS flow remapping.

FIG. 11 is a flow chart illustrating another exemplary process 1100 for facilitating QoS flow remapping in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 800 illustrated in FIG. 8. In some examples, the process 1100 may be carried out by any suitable apparatus or means for carrying out the functions or algorithm described below.

At block 1102, the scheduled entity may detect a mapping reconfiguration of a first QoS flow from a first DRB to a second DRB. In some examples, the scheduled entity may detect the mapping reconfiguration via an RRC message from a scheduling entity in wireless communication with the scheduled entity. In other examples, the scheduled entity may detect the mapping reconfiguration via reflective mapping, in which the mapping reconfiguration is detected based on whether packets associated with the first QoS flow are received from the scheduling entity via the second DRB after being initially received via the first DRB. For example, the QoS mapping circuitry 841, together with the DL reception and processing circuitry 842, shown and described above in reference to FIG. 8 may detect the mapping reconfiguration.

At block 1104, the scheduled entity may identify whether a buffer includes an un-transmitted SDAP data PDU associated with the first QoS flow. In some examples, the buffer may be associated with the SDAP layer in the scheduled entity. For example, the QoS mapping circuitry 841 shown and described above in reference to FIG. 8 may identify whether an un-transmitted SDAP data PDU exists.

If the buffer includes an un-transmitted SDAP data PDU associated with the first QoS flow (Y branch of block 1104), at block 1106, the scheduled entity may include an end marker parameter in an SDAP header of the un-transmitted SDAP data PDU. The end marker parameter indicates that the un-transmitted SDAP data PDU is the final SDAP data PDU associated with the first QoS flow on the first DRB. For example, the QoS mapping circuitry 841 shown and described above in reference to FIG. 8 may include the end marker parameter in the un-transmitted SDAP data PDU.

At block 1108, the scheduled entity may transmit the un-transmitted SDAP data PDU including the end marker parameter to a receiver (e.g., a scheduling entity). For example, the UL generation and transmission circuitry 843, together with the transceiver 810, shown and described above in reference to FIG. 8 may transmit the un-transmitted SDAP data PDU to the receiver.

If the buffer does not include an un-transmitted SDAP data PDU associated with the first QoS flow (N branch of block 1104), at block 1110, the scheduled entity may generate an SDAP control PDU in response to the mapping reconfiguration to indicate that a final SDAP data PDU associated with the first QoS flow has been transmitted on the first DRB. In some examples, the SDAP control PDU may include a control identifier facilitating a distinction between the SDAP control PDU and an SDAP data PDU. For example, the control identifier may include a data/control (D/C) bit in each of the SDAP control PDU and the SDAP data PDU, where the D/C bit facilitates the distinction between the SDAP control PDU and the SDAP data PDU. In some examples, the SDAP control PDU may further include a QoS Flow Identifier (QFI) parameter identifying the first QoS flow. For example, the QoS mapping circuitry 841 shown and described above in reference to FIG. 8 may generate the SDAP control PDU.

At block 1112, the scheduled entity may transmit the SDAP control PDU via the first DRB to a receiver (e.g., the scheduling entity). For example, the UL generation and transmission circuitry 843, together with the transceiver 810, shown and described above in reference to FIG. 8 may transmit the SDAP control PDU to the receiver.

Figure 12:
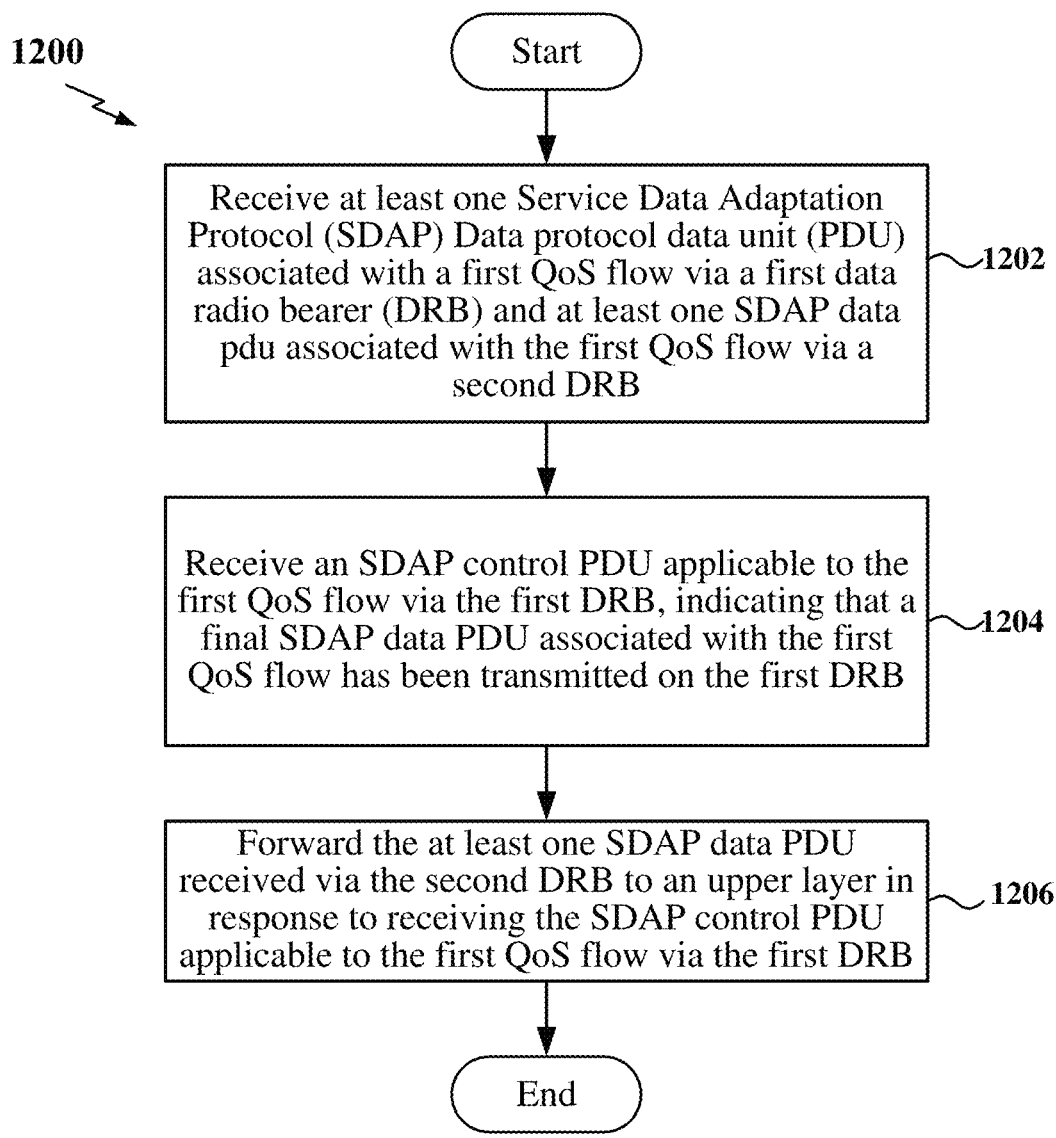
FIG. 12 is a flow chart illustrating another exemplary process for facilitating QoS flow remapping.

FIG. 12 is a flow chart illustrating another exemplary process 1200 for facilitating QoS flow remapping in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 900 illustrated in FIG. 9. In some examples, the process 1200 may be carried out by any suitable apparatus or means for carrying out the functions or algorithm described below.

At block 1202, the scheduling entity may receive at least one SDAP data PDU associated with a first QoS flow via a first DRB and at least one SDAP data PDU associated with the first QoS flow via a second DRB. For example, the QoS mapping circuitry 941, together with the UL reception and processing circuitry 943 and transceiver 910, shown and described above in reference to FIG. 9 may receive the at least one SDAP data PDU associated with the first QoS flow via the first DRB and the at least one SDAP data PDU associated with the first QoS flow via the second DRB.

At block 1204, the scheduling entity may receive an SDAP control PDU applicable to the first QoS flow via the first DRB. The SDAP control PDU may indicate that a final SDAP data PDU associated with the first QoS flow has been transmitted on the first DRB. In some examples, the scheduling entity may identify the SDAP control PDU based on a control identifier within the SDAP control PDU that facilitates a distinction between the SDAP control PDU and an SDAP data PDU. For example, the scheduling entity may ascertain a value of a data/control (D/C) bit in each of the SDAP control PDU and the at least one SDAP data PDU, where the D/C bit facilitates the distinction between the SDAP control PDU and the at least one SDAP data PDU. In some examples, the scheduling entity may identify a QoS Flow Identifier (QFI) parameter in the SDAP control PDU that identifies the first QoS flow and may further apply control information of the SDAP control PDU only to the QoS flow (e.g., first QoS flow) identified by the QFI parameter in the SDAP control PDU. For example, the QoS mapping circuitry 941, together with the UL reception and processing circuitry 943 and transceiver 910, shown and described above in reference to FIG. 9 may receive the SDAP control PDU.

At block 1206, the scheduling entity may forward the at least one SDAP data PDU received via the second DRB to an upper layer in response to receiving the SDAP control PDU applicable to the first QoS flow via the first DRB. For example, the QoS mapping circuitry 941 shown and described above in reference to FIG. 9 may forward the at least one SDAP data PDU received via the second DRB to an upper layer.

Figure 13:
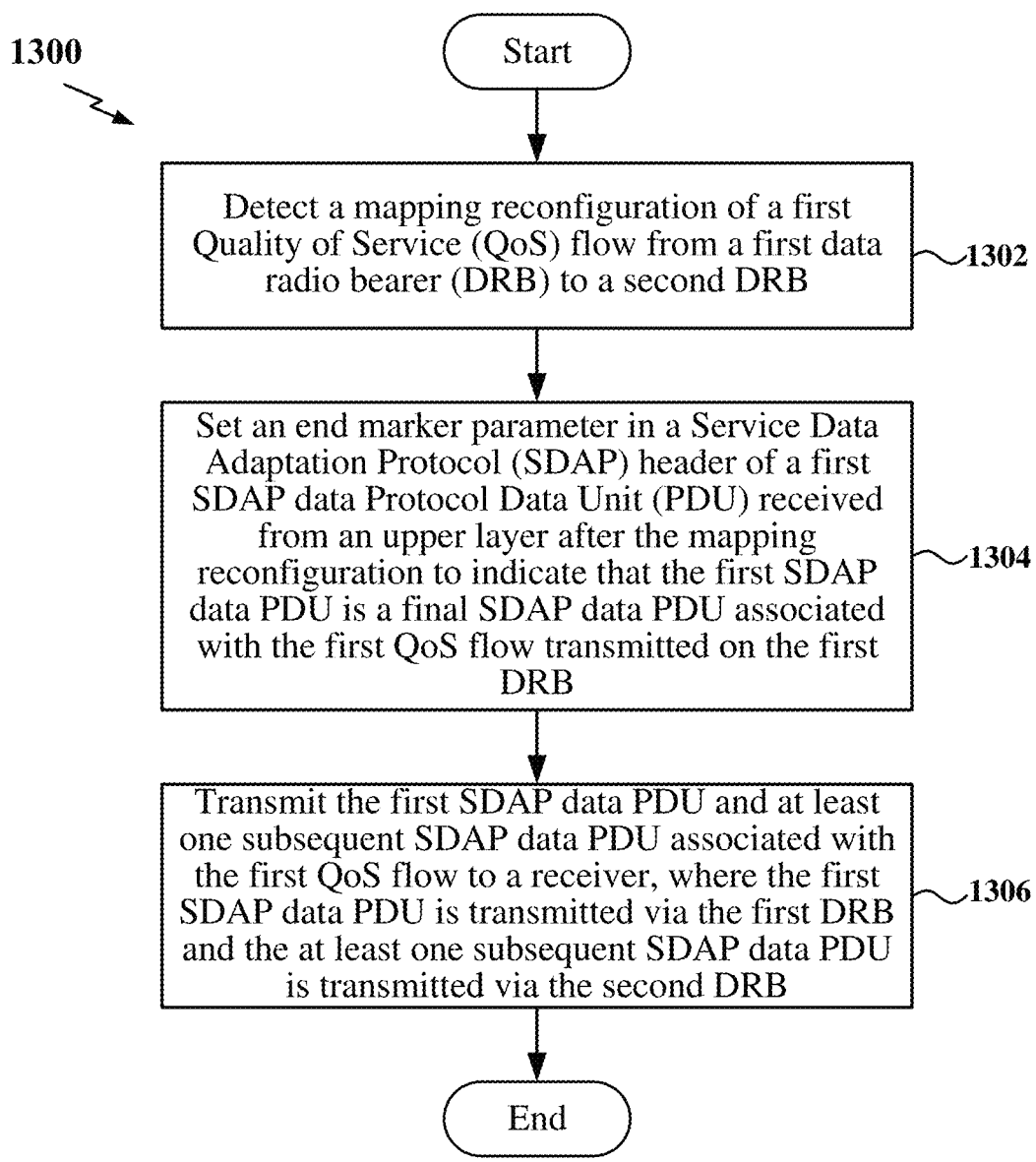
FIG. 13 is a flow chart illustrating another exemplary process for facilitating QoS flow remapping.

FIG. 13 is a flow chart illustrating another exemplary process 1300 for facilitating QoS flow remapping in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 800 illustrated in FIG. 8. In some examples, the process 1300 may be carried out by any suitable apparatus or means for carrying out the functions or algorithm described below.

At block 1302, the scheduled entity may detect a mapping reconfiguration of a first QoS flow from a first DRB to a second DRB. In some examples, the scheduled entity may detect the mapping reconfiguration via a RRC message from a scheduling entity in wireless communication with the scheduled entity. In other examples, the scheduled entity may detect the mapping reconfiguration via reflective mapping, in which the mapping reconfiguration is detected based on whether packets associated with the first QoS flow are received from the scheduling entity via the second DRB after being initially received via the first DRB. For example, the QoS mapping circuitry 841, together with the DL reception and processing circuitry 842, shown and described above in reference to FIG. 8 may detect the mapping reconfiguration.

At block 1304, the scheduled entity may set an end marker parameter in an SDAP header of a first SDAP data PDU received from an upper layer after the mapping configuration. The end marker parameter indicates that the first SDAP data PDU is the final SDAP data PDU associated with the first QoS flow on the first DRB. For example, the QoS mapping circuitry 841 shown and described above in reference to FIG. 8 may include the end marker parameter in the first SDAP data PDU.

At block 1306, the scheduled entity may transmit the first SDAP data PDU including the end marker parameter and at least one subsequent SDAP data PDU associated with the first QoS flow to a receiver (e.g., a scheduling entity). The first SDAP data PDU is transmitted to the receiver via the first DRB, whereas the at least one subsequent SDAP data PDU is transmitted to the receiver via the second DRB. For example, the UL generation and transmission circuitry 843, together with the transceiver 810, shown and described above in reference to FIG. 8 may transmit the first SDAP data PDU and the at least one subsequent SDAP data PDU to the receiver.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 8, and/or 9 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   receiving a plurality of Service Data Adaptation Protocol (SDAP) data protocol data units (PDUs) associated with a first QoS flow via both a first data radio bearer (DRB) and a second DRB from a transmitter;
   receiving an SDAP control PDU applicable to the first QoS flow via the first DRB from the transmitter; and
   forwarding the plurality of SDAP data PDUs received via the second DRB to an upper layer conditional upon receiving the SDAP control PDU applicable to the first QoS flow via the first DRB;
   wherein the SDAP control PDU provides an indication that a final SDAP data PDU associated with the first QoS flow has been transmitted on the first DRB.

2. The method of claim 1, further comprising:
   identifying the SDAP control PDU based on a control identifier within the SDAP control PDU, the control identifier facilitating a distinction between the SDAP control PDU and the at least one SDAP data PDU.

3. The method of claim 2, wherein identifying the SDAP control PDU further comprises:
   ascertaining a value of a data/control (D/C) bit in each of the SDAP control PDU and the at least one SDAP data PDU, and wherein the D/C bit facilitates the distinction between the SDAP control PDU and the at least one SDAP data PDU.

4. The method of claim 1, further comprising:
identifying a QoS Flow Identifier (QFI) parameter in the SDAP control PDU; and
applying control information of the SDAP control PDU only to the first QoS flow identified by the QFI parameter in the SDAP control PDU.

5. A scheduling entity within a wireless communication network, comprising:
a processor;
a transceiver coupled to the processor;
a memory coupled to the processor, wherein the processor is configured to:
receive a plurality of Service Data Adaptation Protocol (SDAP) data protocol data units (PDUs) associated with a first QoS flow via both a first data radio bearer (DRB) and a second DRB from a scheduled entity via the transceiver;
receive an SDAP control PDU applicable to the first QoS flow via the first DRB from the scheduled entity via the transceiver; and
forward the plurality of SDAP data PDUs received via the second DRB to an upper layer conditional upon receiving the SDAP control PDU applicable to the first QoS flow via the first DRB;
wherein the SDAP control PDU provides an indication that a final SDAP data PDU associated with the first QoS flow has been transmitted on the first DRB.

6. The scheduling entity of claim 5, wherein the processor is further configured to:
identify the SDAP control PDU based on a control identifier within the SDAP control PDU, the control identifier facilitating a distinction between the SDAP control PDU and the at least one SDAP data PDU.

7. The scheduling entity of claim 6, wherein the processor is further configured to:
ascertaining a value of a data/control (D/C) bit in each of the SDAP control PDU and the at least one SDAP data PDU, and wherein the D/C bit facilitates the distinction between the SDAP control PDU and the at least one SDAP data PDU.

8. The scheduling entity of claim 5, wherein the processor is further configured to:
identify a QoS Flow Identifier (QFI) parameter in the SDAP control PDU; and
apply control information of the SDAP control PDU only to the first QoS flow identified by the QFI parameter in the SDAP control PDU.

9. A method of wireless communication, comprising:
detecting a mapping reconfiguration of a first Quality of Service (QoS) flow from a first data radio bearer (DRB) to a second DRB;
setting an end marker parameter in a Service Data Adaptation Protocol (SDAP) header of each of a first SDAP data protocol data unit (PDU) and a second SDAP data PDU received from an upper layer after the mapping reconfiguration, wherein the end marker parameter in the first SDAP data PDU provides an indication that the first SDAP data PDU is a final SDAP data PDU associated with the first QoS flow on the first DRB and the end marker parameter in the second SDAP data PDU provides an indication that the second SDAP data PDU is a non-final SDAP data PDU associated with the first QoS flow on the second DRB, wherein each of the first SDAP data PDU and the second SDAP data PDU further comprises a body carrying data; and
transmitting the first SDAP data PDU and the second SDAP data PDU associated with the first QoS flow to a receiver, the first SDAP data PDU transmitted via the first DRB and the second SDAP data PDU transmitted via the second DRB.

10. The method of claim 9, wherein detecting the mapping reconfiguration comprises:
detecting the mapping reconfiguration via a Radio Resource Control (RRC) message.

11. The method of claim 9, wherein detecting the mapping reconfiguration comprises:
detecting the mapping reconfiguration via reflective mapping, wherein the mapping reconfiguration is detected based on whether packets associated with the first QoS flow are received via the second DRB after being initially received via the first DRB.

12. A scheduled entity within a wireless communication network, comprising:
a processor;
a transceiver coupled to the processor;
a memory coupled to the processor, wherein the processor is configured to:
detect a mapping reconfiguration of a first Quality of Service (QoS) flow from a first data radio bearer (DRB) to a second DRB;
set an end marker parameter in a Service Data Adaptation Protocol (SDAP) header of each of a first SDAP data protocol data unit (PDU) and a second SDAP data PDU received from an upper layer after the mapping reconfiguration, wherein the end marker parameter in the first SDAP data PDU provides an indication that the first SDAP data PDU is a final SDAP data PDU associated with the first QoS flow on the first DRB and the end marker parameter in the second SDAP data PDU provides an indication that the second SDAP data PDU is a non-final SDAP data PDU associated with the first QoS flow on the second DRB, wherein each of the first SDAP data PDU and the second SDAP data PDU further comprises a body carrying data; and
transmit the first SDAP data PDU and the second SDAP data PDU associated with the first QoS flow to a receiver, the first SDAP data PDU transmitted via the first DRB and the second SDAP data PDU transmitted via the second DRB.

13. The scheduled entity of claim 12, wherein the processor is further configured to:
detect the mapping reconfiguration via a Radio Resource Control (RRC) message.

14. The scheduled entity of claim 12, wherein the processor is further configured to:
detect the mapping reconfiguration via reflective mapping, wherein the mapping reconfiguration is detected based on whether packets associated with the first QoS flow are received via the second DRB after being initially received via the first DRB.

* * * * *